(12) United States Patent
Van Eessen et al.

(10) Patent No.: US 11,094,255 B2
(45) Date of Patent: Aug. 17, 2021

(54) DRIVER FOR LED DISPLAY

(71) Applicant: BARCO N.V., Kortrijk (BE)

(72) Inventors: Wim Van Eessen, Kruisem (BE); Jasper Irene Lambert, Waregem (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 17/043,128

(22) PCT Filed: Mar. 29, 2019

(86) PCT No.: PCT/EP2019/058114
§ 371 (c)(1),
(2) Date: Sep. 29, 2020

(87) PCT Pub. No.: WO2019/185935
PCT Pub. Date: Oct. 3, 2019

(65) Prior Publication Data
US 2021/0020101 A1    Jan. 21, 2021

(30) Foreign Application Priority Data

Mar. 29, 2018    (EP) .................................. 18165277

(51) Int. Cl.
G09G 3/3233    (2016.01)
(52) U.S. Cl.
CPC ..... *G09G 3/3233* (2013.01); *G09G 2300/026* (2013.01); *G09G 2310/027* (2013.01);
(Continued)
(58) Field of Classification Search
CPC ... G09G 2320/0276; G09G 2320/0693; G09G 2360/145; G09G 3/006; G09G 3/3225; G09G 2320/0626; G09G 3/3233
See application file for complete search history.

(56) References Cited

U.S. PATENT DOCUMENTS

| 4,590,457 A | 5/1986 | Amir |
|---|---|---|
| 6,191,722 B1 | 2/2001 | Briefer |

(Continued)

FOREIGN PATENT DOCUMENTS

| EP | 2148301 A1 | 1/2010 |
|---|---|---|
| WO | 2013086169 A1 | 6/2013 |
| WO | 2017053350 A1 | 3/2017 |

OTHER PUBLICATIONS

Scott Miller et al., Perceptual Signal Coding for More Efficient Usage of Bit Codes, SMPTE Motion Imaging Journal, May/Jun. 2013, pp. 52-59.

(Continued)

*Primary Examiner* — Gerald Johnson
(74) *Attorney, Agent, or Firm* — Hamre, Schumann, Mueller & Larson, P.C.

(57) ABSTRACT

A method, a digital driving circuit and a LED display where images to be displayed in successive frames are converted from an n-bit digital image to a (m+1)-bit digital image, where m<n, by truncating, for each pixel, the (n−m) least significant bits or most significant bits of the n-bit digital image, and encoding in the (m+1) bit an indication. Each pixel of the (m+1)-bit digital image is supplied with a first drive current if the (n−m) least significant bits are truncated, and each pixel of the (m+1)-bit digital image with a second drive current if the (n−m) most significant bits are truncated, where the ratio of the first drive current to the second drive current is such that it results in a brightness ratio of $2^{(n-m)}$, and where the indication provides information on the drive current to be used.

21 Claims, 32 Drawing Sheets

(52) U.S. Cl.
CPC ............... *G09G 2320/0247* (2013.01); *G09G 2320/0626* (2013.01); *G09G 2360/145* (2013.01)

(56) References Cited

U.S. PATENT DOCUMENTS

| | | |
|---|---|---|
| 6,414,661 B1 | 7/2002 | Shen et al. |
| 6,987,787 B1 | 1/2006 | Mick |
| 7,071,894 B1 | 7/2006 | Thielemans et al. |
| 7,176,861 B2 | 2/2007 | Dedene et al. |
| 7,262,753 B2 | 8/2007 | Tanghe et al. |
| 7,450,085 B2 | 11/2008 | Thielemans et al. |
| 7,972,032 B2 | 7/2011 | Meersman et al. |
| 8,339,053 B2 | 12/2012 | Yamasaki et al. |
| 2002/0012008 A1 | 1/2002 | Takagi |
| 2004/0150605 A1* | 8/2004 | Arimoto ................ G09G 5/005 345/100 |
| 2013/0135272 A1 | 5/2013 | Park |
| 2013/0329098 A1* | 12/2013 | Lim ................ H04N 5/232933 348/246 |
| 2015/0317772 A1* | 11/2015 | Lim ........................ G06T 5/20 382/167 |
| 2017/0025064 A1 | 1/2017 | Sarma et al. |
| 2017/0270845 A1 | 9/2017 | Kuo et al. |

OTHER PUBLICATIONS

International Search Report and Written Opinion in corresponding PCT/EP2019/058114, dated Jun. 5, 2019.
Partial European Search Report in corresponding European Application No. 18165277.7 dated Jun. 25, 2018.
European Search Report in corresponding European Application No. 18165277.7 dated Sep. 26, 2018.
International Preliminary Report on Patentability in corresponding PCT Application No. PCT/EP2019/058114, dated Jun. 24, 2020.

* cited by examiner

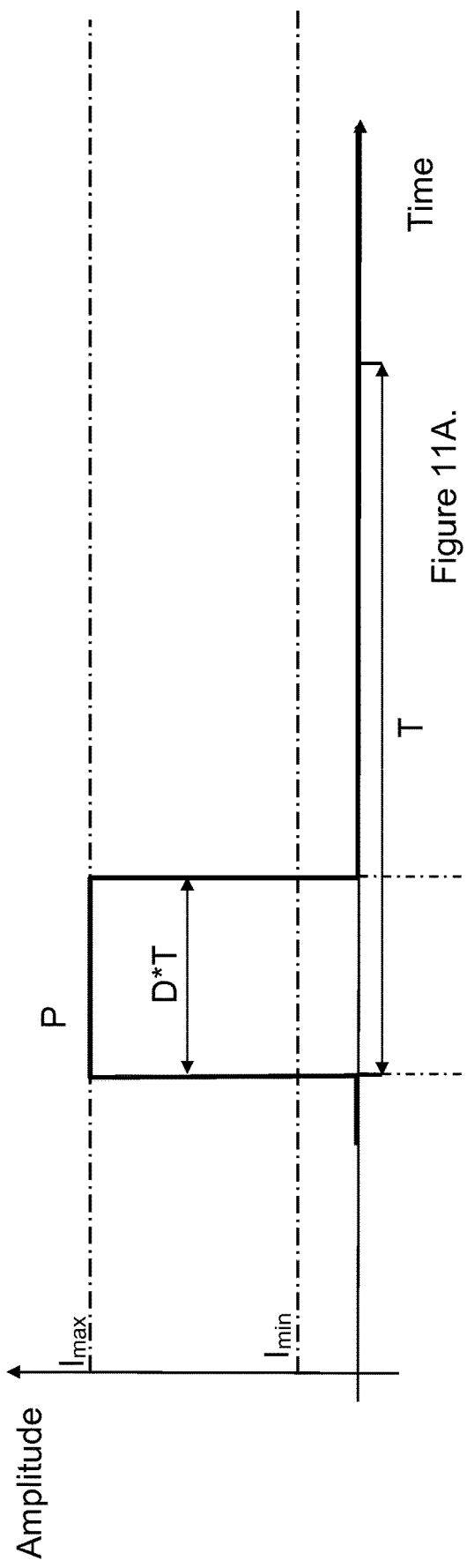
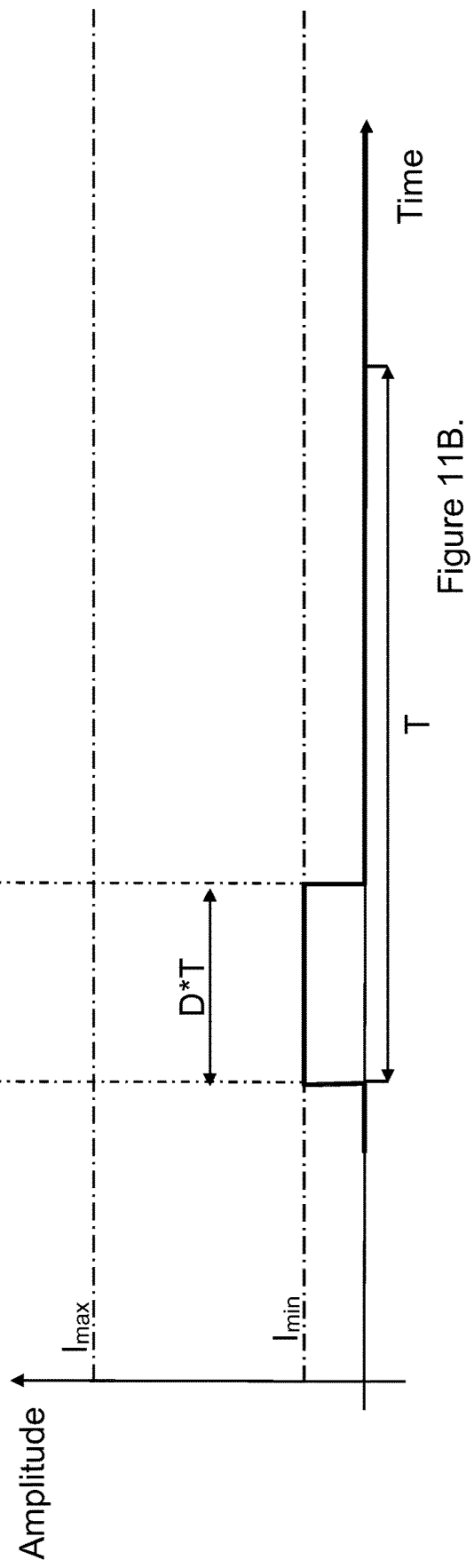

DRIVER FOR LED DISPLAY

FIELD OF THE INVENTION

The present invention pertains to the field of displays such as LED or OLED displays. As well as methods of making or operating such displays, as well as software for executing such methods.

BACKGROUND

The problem of achieving High Dynamic Range displays and light emitting devices is known from the art.

U.S. Pat. No. 6,987,787B1 describes a LED brightness control system for a wide-range of luminance control. The brightness of Light Emitting Diodes, used as backlighting for a Liquid Crystal Display, must be controlled over a range of at least 20000 to 1.

U.S. Pat. No. 6,987,787B1 describes a LED control system wherein the duty cycle of a PWM signal is modulated at the same time as the amplitude of the current pulses. Encoding the duty cycle with 8 bits and the amplitude of the current pulses with 8 bits as well would give a total of 65,536 brightness range.

The modulation of both the duty cycle and the amplitude of the current pulses of the PWM signal would allow smaller brightness steps at the lower brightness level and larger brightness steps at the higher brightness levels.

U.S. Pat. No. 6,987,787B1 remains silent on how to address at the same time a bandwidth constraint (which would require encoding brightness on less than 16 bits) while maintaining the ability to control the brightness over a range of at least 20000 to 1.

In particular, U.S. Pat. No. 6,987,787B1 does not discuss how to prevent visual artefacts that may result from the change in brightness steps per LSB in function of the brightness.

This is not a concern for LEDs of the backlight system since they are not used as pixel and U.S. Pat. No. 6,987,787B1 offers no solution with which to drive the individual LEDs of a LED display with a reduced bit depth while maintaining the brightness range and without introducing visual artefacts.

In U.S. Pat. No. 8,339,053 a "LED dimming apparatus" is described which makes use of two dimming regimes to control the brightness of a LED lighting device.

In a first "lower brightness" regime, the current flowing through a LED is pulse width modulated with constant current pulse amplitude. In a second "higher brightness" regime, the current flowing through the LED is controlled in analog fashion and is not pulsed. The current flowing through the LED is continuous and its amplitude is determined by a constant current circuit.

U.S. Pat. No. 8,339,053 does not offer a viable solution to drive individual LEDs of a LED display. U.S. Pat. No. 8,339,053 does not discuss the problem of visual artefacts and in particular color artifacts that are bound to exist when driving LEDs at different current amplitudes.

To further illustrate the shortcomings of the art, let us consider a LED display with higher than 20 000 to 1 brightness ranges. Such high ranges of brightness require at least 16 bits per LED.

A Pulse-Width Modulated current is used to drive a LED or OLED, the $2^{16}-1$ levels of brightness corresponds to $2^{16}-1$ different duty cycle D. The lowest possible duty cycle will correspond to a current pulse whose duration is $1/(2^{16}-1)$ that of a frame.

To prevent flickering one may choose to split a frame time (interval) in 64 intervals. Each time the duty cycle is increased by $1/(2^{16}-1)$, a sub-pulse of duration $1/(2^{16}-1)$ that of a frame is added in one of the 64 interval. Each of the 64 intervals can accommodate a maximum of 1024 such sub-pulses.

If the duration of one frame is 1/60 s, the duration of one sub-pulse is 254 ns.

The current LED drivers available off-the-shelf typically have 16 outputs per color. An example of current LED drivers is the TLC5940-EP from Texas Instruments. It is a 16-Channel LED Driver with Dot Correction and Grayscale PWM Control. The latest LED drivers can drive 16 RGB LEDs. An X1.6 LED tile from Barco nv Belgium has an array of 120*135 LEDs. This means that more than 1013 drivers are required. From the point of view of Printed Circuit Board design, this is nearly impossible to place and route such a high number of current LED drivers at the back of a LED tile. The situation gets even worse with increasing numbers of LEDs per tile.

A solution known to the art is banking. Banking means that LEDs are connected to the same output of a LED driver. Common banking numbers are 8, 12, 16, 32 . . . . The number of current LED drivers decreases but a higher current is required at the output of each LED driver to reach the same brightness level averaged over the duration of a frame. An example of banking (with a banking number of 4) is given on FIG. 2.

Another disadvantage is that this requires multiplexing the time that the LEDs are driven. Without banking in the example above there were $2^n$ clock pulses within one frame, now if there is a banking of 16 there is a need for $2^n \times 16$ clock pulses. This means the clock frequency to drive the LEDs will be 16 times higher.

Knowing that the maximum clock speed of the driver is +/−30 MHz, the $2^n \times 16$ clock pulses within one frame cannot be achieved anymore. Taking the example with a banking of 16, then 60 Hz×$2^{16}$×16 banks=63 MHz.

The designer of LED drivers for display tiles is thus facing the following dilemmas:
- Limiting the number of banks alleviates the problem of the range of brightness that can be covered with single current amplitude for the pulses of current. However this increases the number of LED drivers per tile and thus the cost of the tile (assuming that it is possible at all).
- Limiting the number of bits to be displayed obviously alleviates the bandwidth problem. For instance, going from 16 bit to 14 bit per pixel per color lowers the required bandwidth by a factor 4. However details are lost at low brightness and depending on the behavior of LED of different colors, the color gamut may be affected.

The art needs improvement.

SUMMARY OF THE INVENTION

According to an aspect of the present invention, there is provided a method of using image data, representing images to be displayed in successive frames, to drive an active matrix display having pixels that include a drive transistor and a light emitting device, said method comprising:
converting each frame represented by an n-bit digital image to a (m+1)-bit digital image, wherein m<n, by truncating, for each pixel, the (n−m) least significant bits or most significant bits of the n-bit digital image, and encoding in the (m+1) bit an indication, supplying each pixel of the (m+1)-bit digital image with a first drive current if the (n−m) least significant bits are truncated, and each pixel of the (m+1)-bit digital image with a second drive current if the (n−m) most significant bits are truncated, wherein the ratio of the first drive current to the second drive current is such that it results in a brightness ratio of 2^(n−m), and wherein the indication provides information on the drive current to be used.

The first and second drive currents which produce a brightness ratio of 2^(n−m) can be determined by optical measurements of outputs of the active matrix display.

A relationship between brightness and drive current can be at least in part non-linear.

If a single bit is used for the (m+1) bit, then there only two currents coded by this bit being coded by 0 or 1. Based on Barten curves/PQ curves there is a need for display of a test pattern. Preferably a number of pixels are used to determine the maximum and minimum currents to provide a brightness ratio of 2^(n−m. For example a tile or the tiled display can be used to generate the output when patterns are displayed.

Hence the optical measurements can be made using a set of pixels displaying a test pattern such as according to Barten.

It is an advantage of the present invention that the timing restrictions on the hardware are reduced by a factor 2^(n−m). The data which is sent to the driver is not n bit but (m+1)-bit, including an indicator of which of the high or low current is to be used. This lowers the bandwidth to the LED or OLED drivers. Furthermore, while the number of bits is reduced to m, details are not lost anymore at lower brightness and the color gamut is not affected. The bandwidth is furthermore greatly improved.

In embodiments of the present invention, the conversion can be performed with an electro optical transfer function such as a gamma curve or a PQ curve, or a lookup table derived from an electro optical transfer function.

In preferred embodiments of the present invention, the transition from the first current to the second current is performed such that it results in a luminance increase which is below a minimum detectable contrast evaluated according to a model of the human visual system.

Thus, as a lower current is used for the lower brightness range, it behaves as if the display was an n-bit display (although implemented as an—bit display), and for the higher range, having a higher current, provides also the same behaviour as a n-bit display, as the change of current is performed in a region wherein a difference cannot be observed. The question of the inability for observing can be determined by following a model of a human visual system.

Preferably, the model of the human visual system is based on at least one of just noticeable difference, on the Barten model, on Weber's law, on De Vries-Rose square-root law, on a PQ curve.

Advantageously, the Barten model and PQ curve haven proven to be very efficient for this type of display, and have also been implemented as standards in the present technical field.

In preferred embodiments of the present invention, the pixels of the active matrix display are LED or OLED pixels.

In preferred embodiments of the present invention, each frame can be divided into sub-frames.

Advantageously, a sub-frame of a frame is driven with a first drive current and another sub-frame of the frame is driven with a second drive current.

According to another aspect of the present invention, there is provided a digital driving circuit for driving an active matrix display having pixels each of which can include a drive transistor, a light emitting device, and a digital to analog converter, the digital driving circuit further comprising means to convert successive frames represented by an n-bit digital image to a (m+1)-bit digital image, wherein m<n, by truncating, for each pixel, the (n−m) least significant bits or most significant bits of the n-bit digital image, and means to encode in the (m+1) bit an indication of which current is to be used, wherein the digital to analog converter is configured to supply each pixel of the (m+1)-bit digital image with a first drive current if the (n−m) least significant bits are truncated, and each pixel of the (m+1)-bit digital image with a second drive current if the (n−m) most significant bits are truncated, wherein the ratio of the first drive current to the second drive current is such that it results in a brightness ratio of 2^(n−m), and wherein the indication provides information on the drive current to be used.

The first and second drive currents which produce a brightness ratio of 2^(n−m) can be determined in advance, e.g. in factory calibration, by optical measurements of outputs of the active matrix display.

If a single indicator bit is used for the (m+1) bit, then there are only two currents coded by this bit being 0 or 1.

In an embodiment of the present invention, the means to convert comprise an electro optical transfer function such as a gamma curve or a PQ curve, or a lookup table derived from an electro optical transfer function.

Advantageously, the transition from the first current to the second current is performed such that it results in a luminance increase which is below a minimum detectable step or contrast evaluated according to a model of the human visual system.

Preferably, the model of the human visual system is based on at least one of just noticeable difference, on the Barten model, on Weber's law, on De Vries-Rose square-root law, on a PQ curve.

In preferred embodiments of the present invention, the pixels of the active matrix display are LED or OLED pixels.

Preferably, each frame can be divided into sub-frames.

Advantageously, a sub-frame of a frame is driven with a first drive current and another sub-frame of the frame is driven with the second drive current.

According to another aspect of the present invention, there is provided a LED or OLED display comprising the digital driving circuit described above.

In any of the embodiments of the present invention a low pass filter can be used to smooth the current output. However bearing in mind that brightness is the same as luminance but perceived by the human eye, the human eye acts as a low pass filter that averages the sequence of light pulses. So for the PWM driving pulses the brightness or the average luminance during one PWM period, can be filtered by the eye LPF (Low Pass Filter). Thus there is in general no need to provide a low pass filter for a display.

The technical effects and advantages of embodiments of according to the present invention relating to displays correspond mutatis mutandis to those of the corresponding embodiments of the method according to the present invention.

BRIEF DESCRIPTION OF THE FIGURES

These and other technical aspects and advantages of embodiments of the present invention will now be described in more detail with reference to the accompanying drawings, in which:

FIG. 11A shows a pulse amplitude $I_{max}$

FIG. 11B shows a pulse amplitude $I_{min}$.

DEFINITIONS AND ACRONYMS

Figure 1:
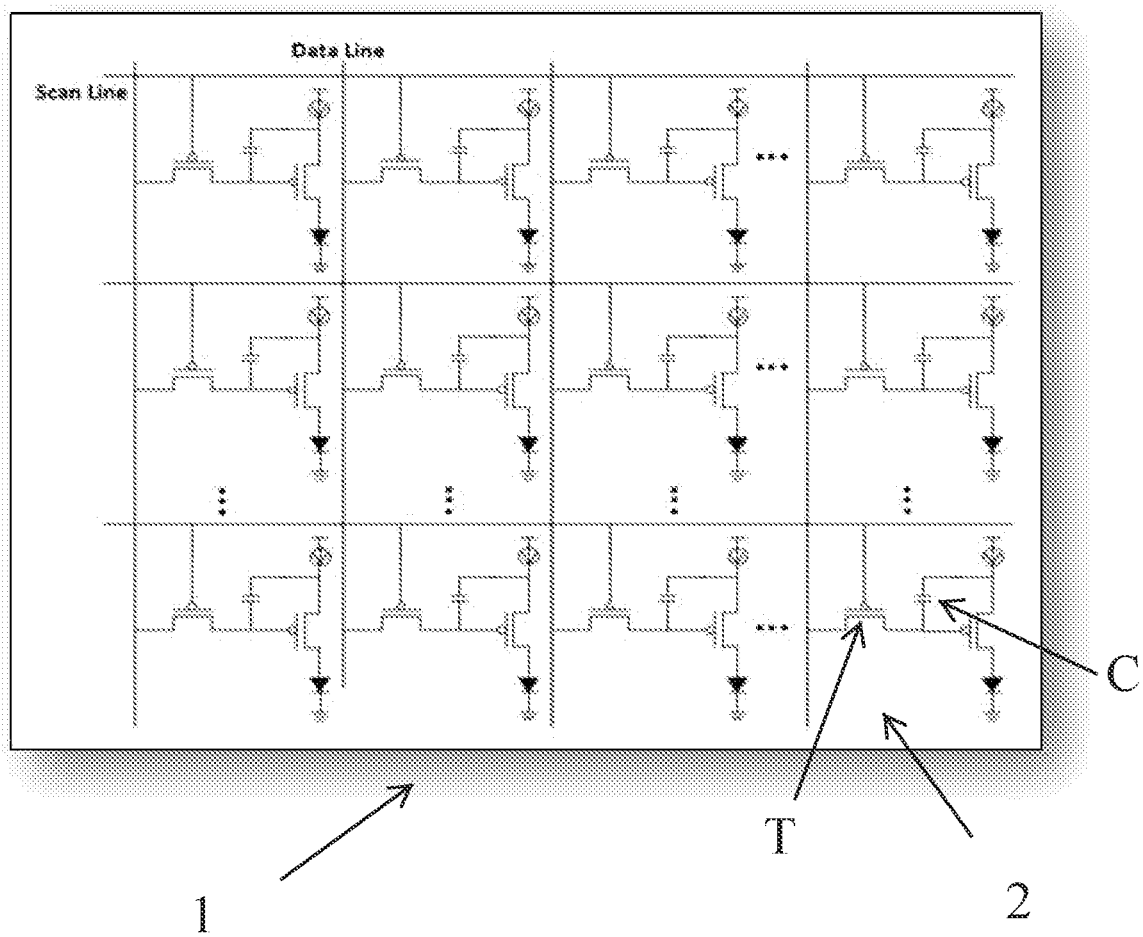
FIG. 1 illustrates a schematic drawing of an active matrix.

Active Matrix. Active matrix 1 is a type of addressing scheme used in flat panel displays. In this method of switching individual elements (pixels), each pixel 2 is attached to a transistor T and capacitor C actively maintaining the pixel state while other pixels are being addressed. A schematic of an active matrix is given on FIG. 1.

Banking. Banking means that multiple LEDs or OLEDS are connected to the same output of the LED or OLED driver, respectively. This has the advantage that the number of LED or OLED drivers decreases substantially. Common banking numbers are 4, 8, 12, 16, 32. An example of banking is shown on FIG. 2. In that example, the banking number is 4. An output 30 of a LED or OLEd drive 20 is connected to 4 LEDs or OLEDS instead of to a single one. Each of the four LEDs or OLEDS (21, 22, 23, 24) is connected to a power supply 29 by means of a switch (25, 26, 27, 28). Only one of the switches is closed at any given time.

Barten (Curve).

The Barten model is valid for foveal vision in photopic conditions. It has been verified with a number of experiments covering the luminance range from 0.0001 to 1000 cd/m². A "Barten Curve" represents the evolution of contrast sensitivity in function of the average luminance.

The Barten curve is a threshold for visible brightness steps in function of global brightness. All values below the curve are not visible by the human eye.

Global brightness is defined based on given test patterns displayed on the display (in particular the LED or OLED display) under consideration.

Figure 3:
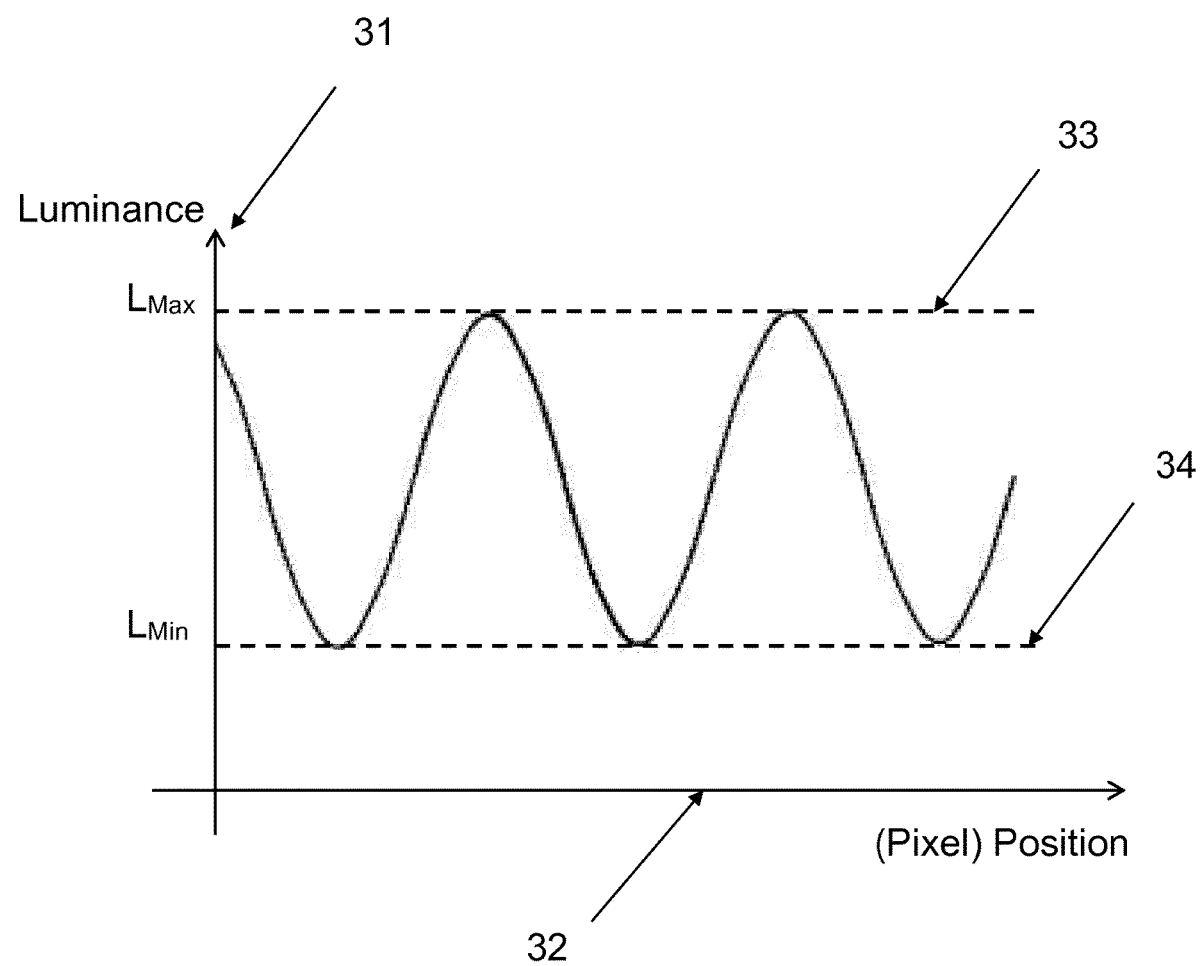
FIG. 3 shows the luminance with a sinusoidal test pattern in function of the position along a given direction across a display surface (typically a row or a column of pixels or sub-pixels).

For instance, the test pattern can be a sinusoidal distribution across one direction of the display (as illustrated on FIG. 3). FIG. 3 shows the luminance in function of the position along a given direction across a display surface (typically a row or a column of pixels or sub-pixels).

The luminance (axis 31) varies as a sine wave (or more precisely as a constant+a sine wave: $L=L_0+A*\sin(\alpha x)$ where $L_0$ is a constant or baseline luminance, x the position along the given direction across the display surface, A and $\alpha$ are constants) and varies between a maximum 33 ($L_{Max}$) and a minimum 34 ($L_{Min}$).

The contrast sensitivity function (CSF) is the reciprocal of the minimum modulation that can be seen by an observer of a display. In this example, the modulation is given by $m=(L_{Max}-L_{Min})/(L_{Max}+L_{Min})$.

The CSF is the reciprocal of the minimum modulation visible:

$$CSF = 1/m_{min}$$

Figure 4:
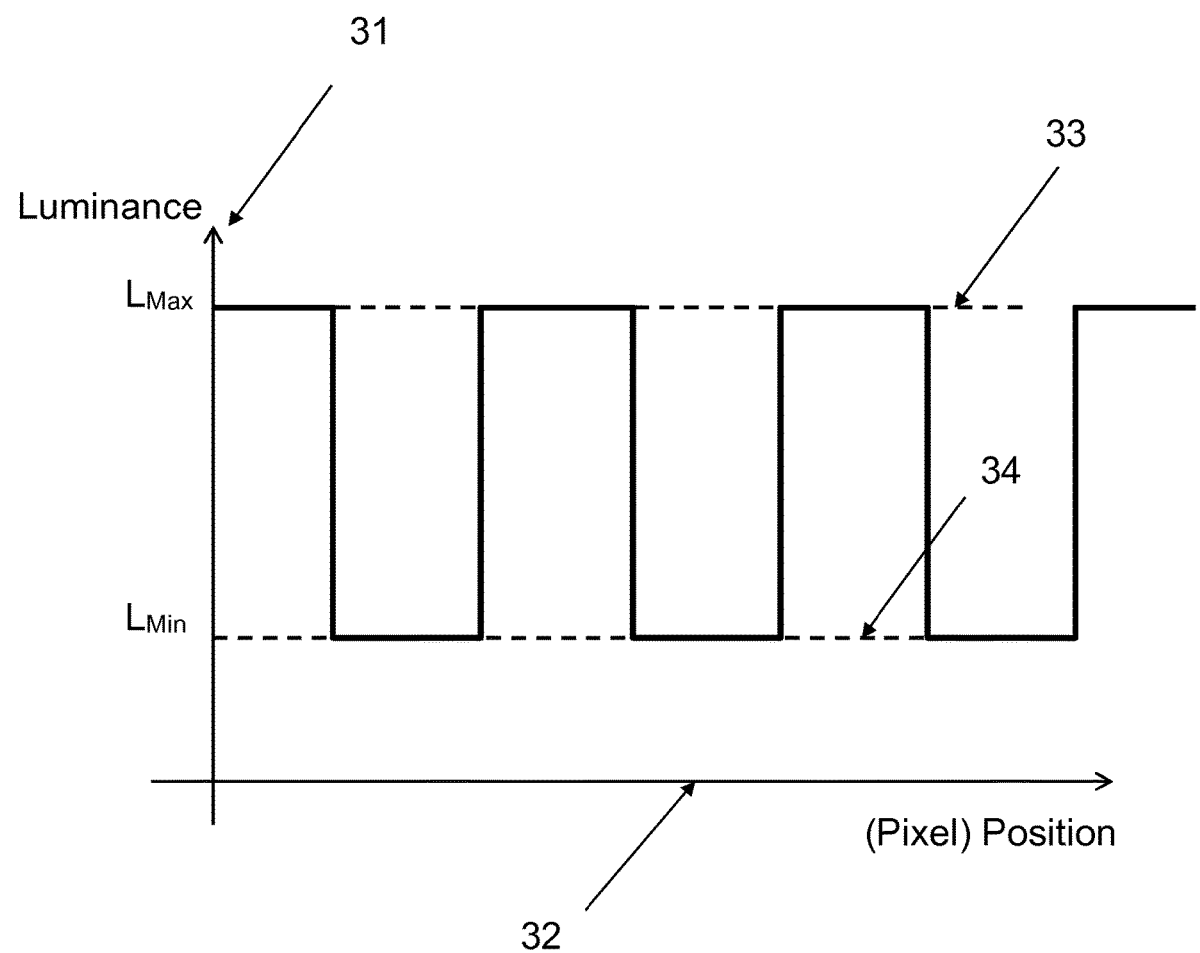
FIG. 4 shows the luminance with a square wave test pattern in function of the position along a given direction across a display surface (typically a row or a column of pixels or sub-pixels).
Figure 5:
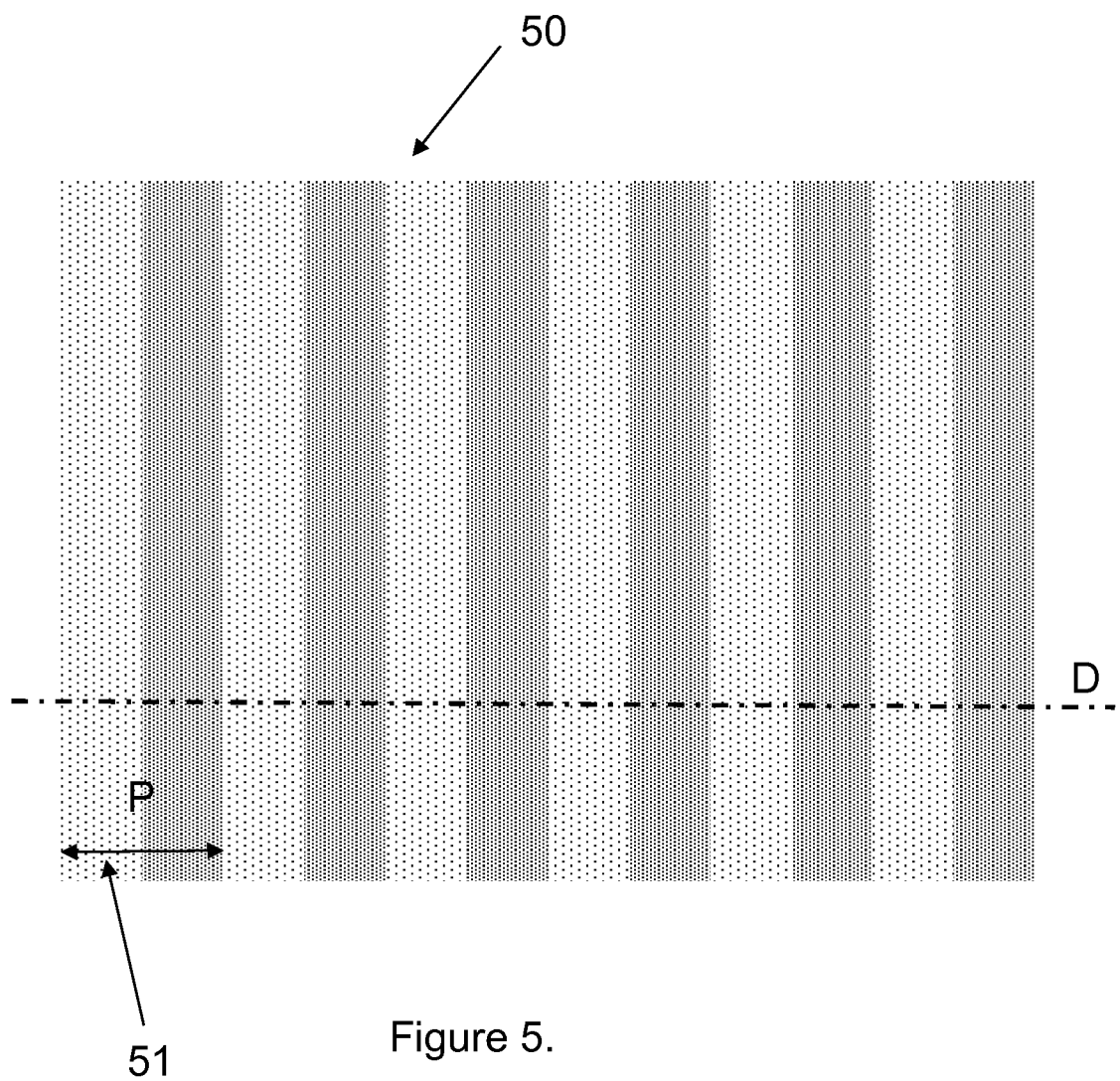
FIG. 5 shows a test pattern as displayed on a display surface wherein the luminance varies as a square wave superposed to an average luminance.

Instead of a sine wave modulation, a square wave can be used. FIG. 4 shows how the luminance varies along a direction D across a test pattern like the one on FIG. 5. FIG. 5 shows a test pattern 50 as displayed on a display surface (a complete display or a tile of a tiled display). Along the direction "D", the luminance varies as a square wave superposed to an average luminance $L(x)=L_O+\text{Square Wave}(x)$ where x is a position along the direction "D". The square wave has a period P (51) that covers at least two pixels but can contain more than 2 pixels.

The test pattern can also be a ramp on which a square or sinewave is superposed.

This Barten model shows a mathematical representation of the human eye in terms of minimum detectable contrast steps in function of the luminance.

$$CSF = \frac{1}{m_t} = \frac{M_{opt}(u)/k}{\sqrt{\frac{2}{T}\left(\frac{1}{X_0^2}+\frac{1}{X_{max}^2}+\frac{u^2}{N_{max}^2}\right)\left(\frac{1}{\eta pE}+\frac{\phi_0}{1-e^{-(u/u_0)^2}}\right)}}$$

With:

$$M_{opt}(u) = e^{-2\pi^2\sigma^2 u^2}$$

$$\sigma = \sqrt{\sigma_0^2 + (C_{ab}d)^2}$$

$$d = 5 - 3\tanh\left(0.4\log\left(\frac{LX_0^2}{40^2}\right)\right)$$

$$E = \frac{\pi d^2}{4}L\left(1-\left(\frac{d}{9.7}\right)^2+\left(\frac{d}{12.4}\right)^4\right)$$

The following parameters can be used for the examples shown in the present description:

| | |
|---|---|
| k | 3 |
| $\sigma_0$ | 0.5 arc min. |
| $C_{ab}$ | 0.08 arc min./mm |
| T | 0.1 s |
| $X_{MAX}$ | 12 degrees |
| $N_{MAX}$ | 15 cycles |
| $\eta$ | 0.03 |
| $\phi_0$ | $3 \times 10^{-8}$ sec deg$^2$ |
| $u_0$ | 7 cycles/degree |
| p | $1.285 \times 10^6$ photons/sec/deg$^2$/Td |
| u | 1 |
| $\chi_0$ | 40 degrees |

With $m_t$ as minimum modulation threshold:

$$m_t = \frac{1}{CSF} = \frac{L_{max}-L_{min}}{L_{max}+L_{min}}$$

And $$\Delta L = L_{max} - L_{min}$$

$$L_{ave} = \frac{L_{max}+L_{min}}{2}$$

wherein:

$$C_{t,SINE} = \frac{\Delta L_{min,SINE}}{L_{AVE}} = \frac{2}{CSF}$$

These are the minimum detectable contrast steps for a sinusoidal pattern according to the Barten Curve.

For a squarewave or ramp:

$$C_{t,SQW} = \frac{\Delta L_{min,SQW}}{L_{AVE}} = \frac{\pi}{2CSF}$$

$$C_{t,RAMP} = \frac{\Delta L_{min,RAMP}}{L_{AVE}} = \frac{\pi}{CSF}$$

These curves will be used as a benchmark on how well the system performs. The square wave pattern will provide the lowest values followed by the sinusoidal pattern and the ramp.

BD or Bit Depth. The number of bits used to encode e.g. the luminance, gray scale, color . . . of a pixel.

Contrast, Contrast Ratio, Contrast Sensitivity.

Objects can generally be better distinguished from each other if the difference in luminance is large. The relative difference in luminance is more important than the absolute difference. This relative difference can be expressed by the ratio between two luminance values and is known as contrast ratio. This relative difference can also be expressed by the difference between two luminance values divided by their sum which is called contrast. The reciprocal of the minimum contrast required for detection (by the human eye) is called contrast sensitivity.

Different test patterns can be used to evaluate contrast, contrast ratio and contrast sensitivity.

One of the test pattern is a sinusoidal luminance pattern. In that case, contrast is defined by the amplitude of the sinusoidal variation divided by the average luminance. This quantity is called modulation depth or modulation. The minimum modulation required for the detection of the pattern is known as the modulation threshold.

When contrast sensitivity is measured with non-sinusoidal luminance variations, the contrast is determined by the difference between the maximum and minimum luminance divided by the sum of them. This is called the Michelson contrast.

Digital-to-Analog Converter (DAC). A device for converting binary or digital code into an analog signal. A DAC device converts an abstract finite precise number, typically a fixed-point binary number, into a definite physical variable such as voltage, pressure, luminance or brightness.

PWM as digital-to-analog converter can be found in "The Art of Electronics" third edition by Paul Horowitz. With a PWM DAC, the system being driven often acts as a low pass filter that time averages the modulated signal. As seen in the example given by Horowitz, the PWM signal can drive a light emitting diode. In particular, it clarifies that the system being driven by the PWM signal is slowly responding (i.e. the system is the low pass filter). Hence a PWM DAC can be a time averaged DAC. The Human eye can act as a low pass filterso apparatus according to the present invention does not need such a filter.

With reference to a DAC (and in particular PWM DAC) see:
 (a) "Digital to analog converter utilizing pulse width modulation" see U.S. Pat. No. 4,590,457A
 (b) "Pulse width modulation digital to analog converter" see U.S. Pat. No. 6,191,722

The skilled person is also aware that PWM units are known from DC motor control. Energy transferred is related to the average current, e.g. the current definitely does not stay constant during one PWM cycle. Embodiments of the present invention can make use of a conventional DAC which are often sampled and held i.e. so that the output current, remains constant until a new binary code is input into the DAC and a conversion requested. However embodiments of the present invention may make use of pulsed or varying drive currents.

Duty Cycle. The term duty cycle describes the proportion of 'on' time to the regular interval or 'period' of time; a low duty cycle corresponds to low power, because the power is off for most of the time. Duty cycle is expressed in percent, 100% being fully on.

EOTF Electro-Optical Transfer Function. It describes how to turn digital code words into displayed luminance. Examples of EOTF are the Gamma curve, based on CRT physics, and the PQ curve, introduced by Dolby for HDR (dynamic range of 0 to 10,000 cd/m$^2$ and usually 10-12 bits). Ideally, the EOTF should be defined according to a human visual response model.

The Gamma function has the following expression:

$$Y_{Gamma} = L * V^t$$

$$0 \leq V \leq 1$$

L being the maximum brightness of the display and V normalized digital input value.

The PQ Curve has the following expression:

$$Y_{PQ} = L * \left( \frac{V^{\frac{1}{m}} - c_1}{c_2 - c_3 V^{\frac{1}{m}}} \right)^{\frac{1}{n}}$$

$$0 \leq V \leq 1$$

The following parameters have been chosen for the examples shown in embodiments of the present invention:

| | |
|---|---|
| m | 78.8438 |
| n | 0.1593 |
| $c_1$ | 0.8359 |
| $c_2$ | 18.8516 |
| $c_3$ | 18.6875 |
| L | 10.000 cd/m$^2$ |

A standard PQ curve goes from 0 cd/m$^2$ to 10,000 cd/m$^2$. If there is a maximum luminance limitation on a display of 2500 cd/m$^2$ there are two options:
 1) Follow the standard PQ curve and clip at the maximum luminance
 2) Recalculate the standard PQ curve between 0 and 2500 cd/m$^2$.

Option 1 has the advantage that when two displays with the same input and PQ curve are compared, they should show the content exactly the same. However, all values above 2500 cd/m$^2$ will have the same brightness value.

Option 2 has the advantage that the full digital input range is used. However the relationship input versus output is lost and on a non-ideal display more low light values are thrown away.

Flicker. Flicker is a visible fading or decrease in brightness between two successive frames or more generally cycles (like e.g. two successive period of a PWM signal).

Frame. A frame is one picture of the series of pictures e.g. as on a length video of film. A frame can also mean a complete image for display (as on a display or a tile of a tiled display). In some context, frame can also mean the time interval during which a frame is displayed.

JND. Just Noticeable Difference. In the branch of experimental psychology focused on sense, sensation, and perception, a just-noticeable difference or JND is the amount something must be changed in order for a difference to be noticeable, detectable at least half the time (absolute threshold). This limen is also known as the difference limen, differential threshold, or least perceptible difference. In a LED or OLED display, one is in particular interested by the minimum step in luminance that will be perceived by the human visual system.

Weber's law is sometimes used alone or in combination with other laws to define JND. Weber's law defines that there is a constant correlation between the JND and the reference brightness.

Weber's law or fraction can be expressed as $$\frac{\Delta I}{I} = K_w,$$

wherein $K_w$ is called the Weber Fraction, and wherein $\Delta I$ is an increment in the intensity (or the smallest detectable increment in intensity), and I is the initial intensity. In other words, Weber's fraction provides a relationship between the initial intensity (or reference brightness) and the smallest detectable increment in intensity, or JND. According to this law, the minimum detectable contrast, i.e. the reciprocal of contrast sensitivity, is constant regardless the brightness. It is believed that the ratio is between 1/50 and 1/100. However, it increases below and above certain brightness.

According to Weber's law it is possible to determine every JND with every brightness.

Weber's law can be not valid over the entire brightness range. For very low and very high intensities, the Weber fraction is too strict. Therefore, for low luminance, De Vries-Rose square-root law can be used:

$$\frac{\Delta I}{I} = k \times I^{-1/2},$$

The origin of this is photon noise, i.e. the number of photons in a light pulse is not exactly fixed at a certain luminance but varies a "bit" (spread) around an average value according to the Poisson distribution. This means that the luminance difference or Delta I must be sufficiently large to be able to be distinguished from the fluctuations of the background luminance. The Weber fraction is the strictest over the entire range, so that if one complies with the Weber fraction one will automatically also comply with De Vries-Rose square-root law. Thus Weber's law is one suitable law to use in defining JND but there can be better solutions by using other laws/rules.

Led Display.

The following patents, from the same applicant, provide definitions of LED displays and related terms. These are hereby incorporated by reference for the definitions of those terms.

U.S. Pat. No. 7,972,032B2 "LED Assembly",

U.S. Pat. No. 7,176,861B2 Pixel structure with optimized subpixel sizes for emissive displays, U.S. Pat. No. 7,450,085 Intelligent lighting module and method of operation of such an intelligent lighting module, U.S. Pat. No. 7,071,894 Method of and device for displaying images on a display device.

Reference to LED display includes an OLED display.

LSB. Least Significant Bit.

Luminance (L). The luminous intensity per unit area projected in a given direction. The SI unit is the candela per square meter, which is still sometimes called a nit. Luminance and brightness have often been used interchangeably in the literature, even though luminance and brightness are not one and the same thing. Here, whenever "brightness" is used, the inventors mean "luminance".

Figure 24:
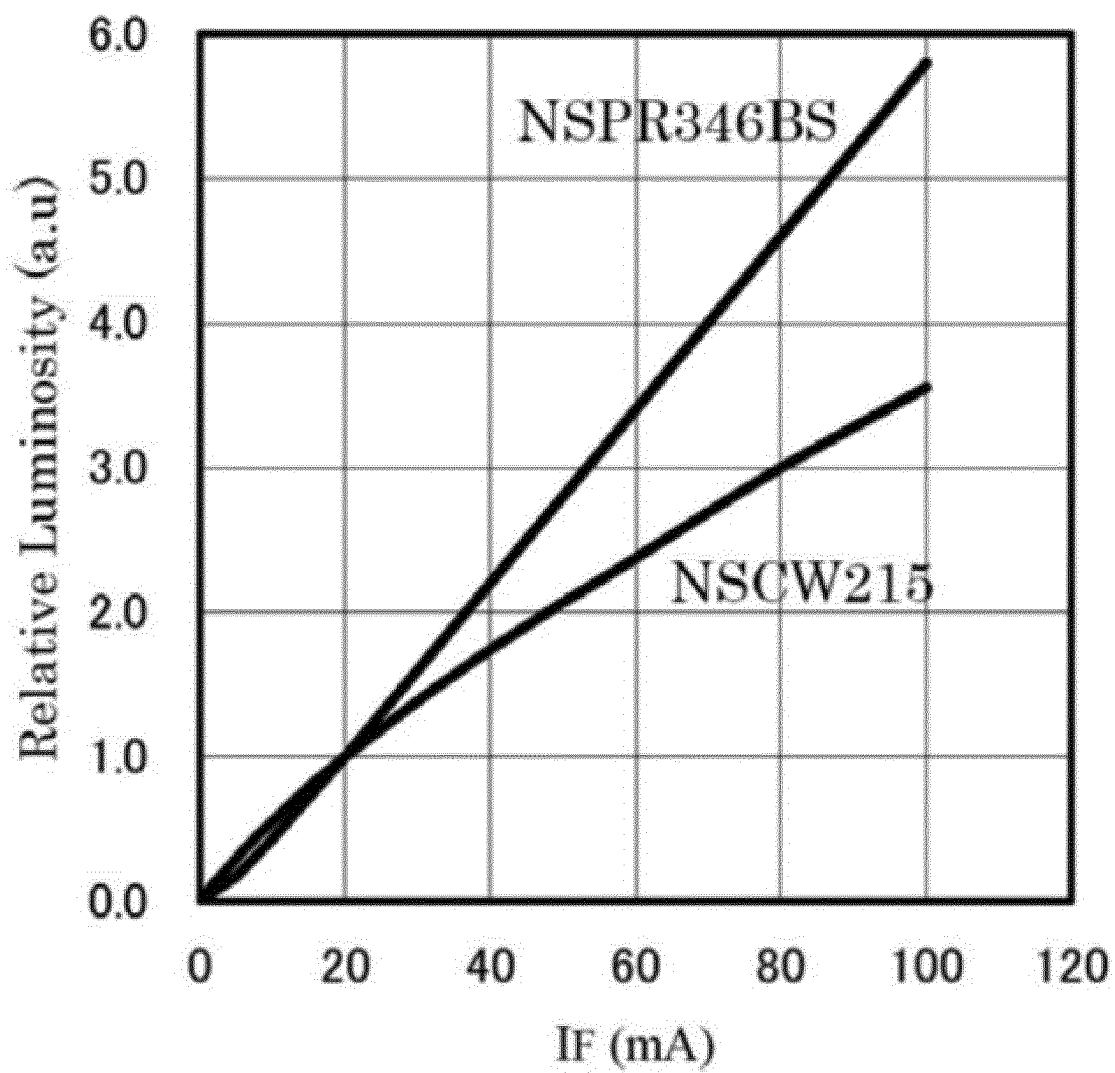
FIG. 24 shows the non-linear functional relation between the relative luminance of two different LEDs (y axis) and the forward current in the LEDs (x axis).

Of particular importance when designing a LED or OLED display is the functional relationship between luminance and the forward current through the LEDs or OLEDs used in the LED or OLED display. FIG. 24 shows how the relative luminance varies in function of the forward current in LEDs commercialized by companies such as Nichia. The non-linearity can be stronger for e.g. blue LEDs than for e.g. red LEDs or for white leads. However, in any display there is a high probability that there will be at least some OLEDs or LEDS which have a relative luminance that varies in function of the forward current in a non-linear manner. In such cases the brightness or luminance must be obtained for forward current values, e.g. by optical measurements optionally with patterns displayed on the display in order to determine this non-linear relationship. Once these measurements have been done currents can be selected which produce factors of 2 in brightness which generally cannot be achieved by factors of 2 in the forward current.

MSB. Most Significant Bit.

Figure 6:
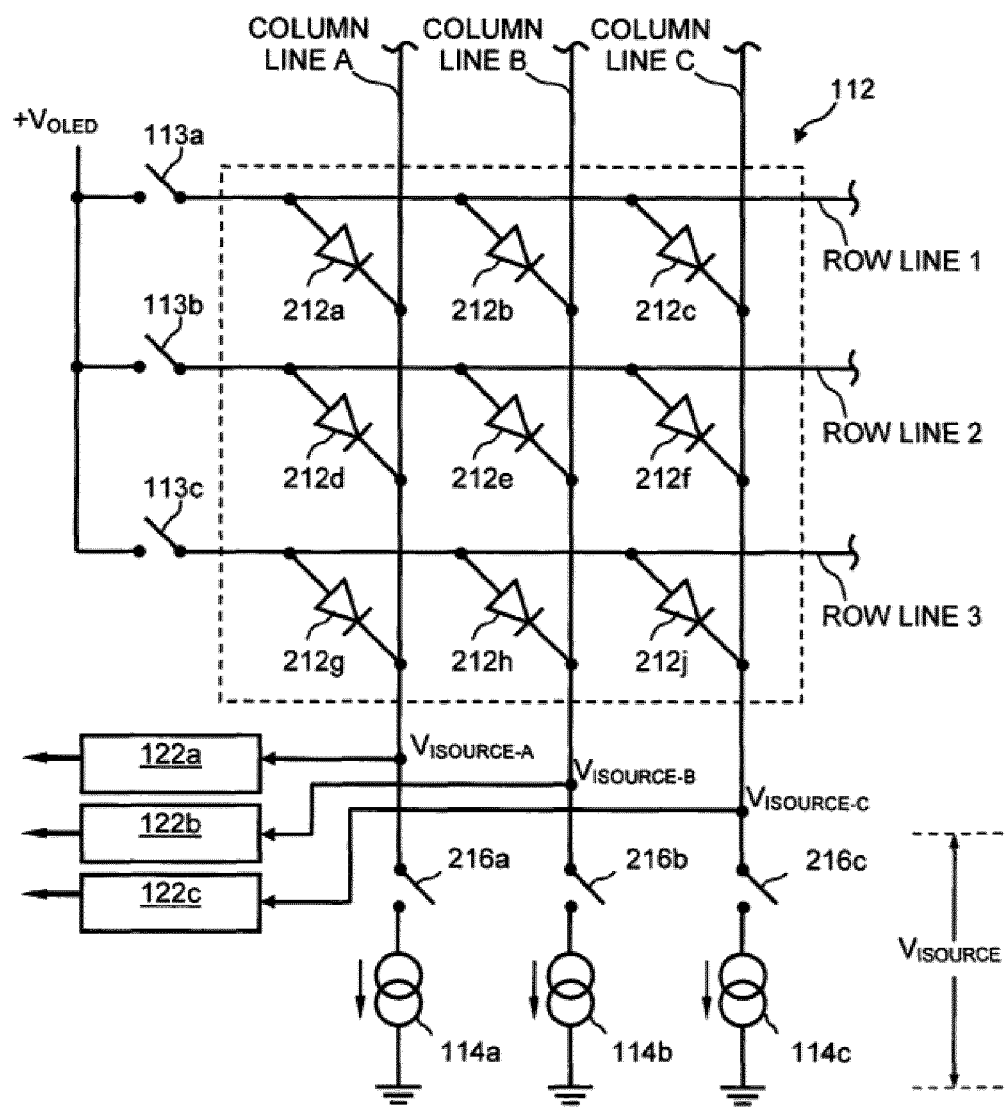
FIG. 6 shows a principle schematic of a passive matrix.

Passive Matrix. Passive matrix addressing is an addressing scheme used in early LCDs. This is a matrix addressing scheme meaning that only m+n control signals are required to address an m×n display. A pixel in a passive matrix must maintain its state without active driving circuitry until it can be refreshed again. FIG. 6 shows a principle schematic of a passive matrix.

Figure 2:
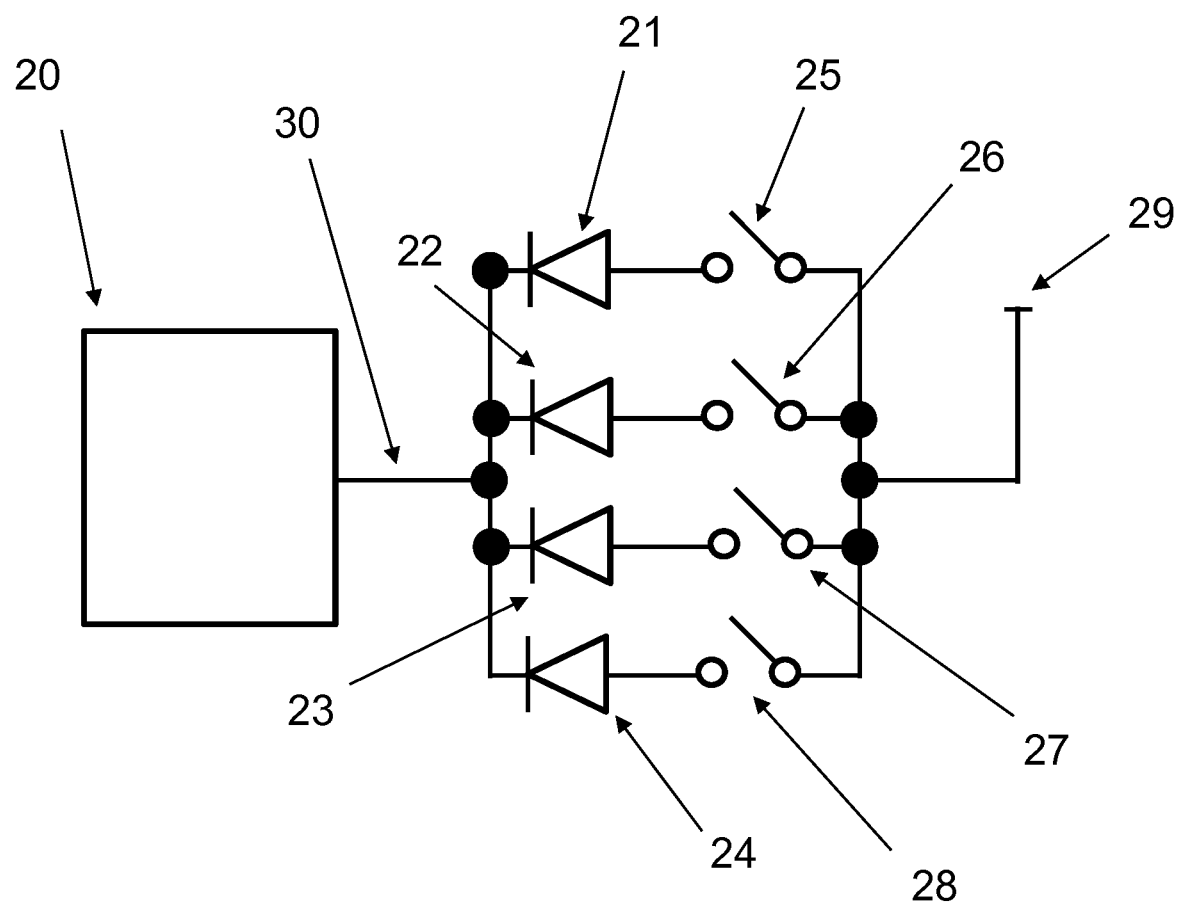
FIG. 2 illustrates an example of banking.

This Figure is shown as FIG. 2 in U.S. Pat. No. 7,262,753 patent, from the same applicant as the present application. The description of said Figure is hereby incorporated by reference.

Figure 7:
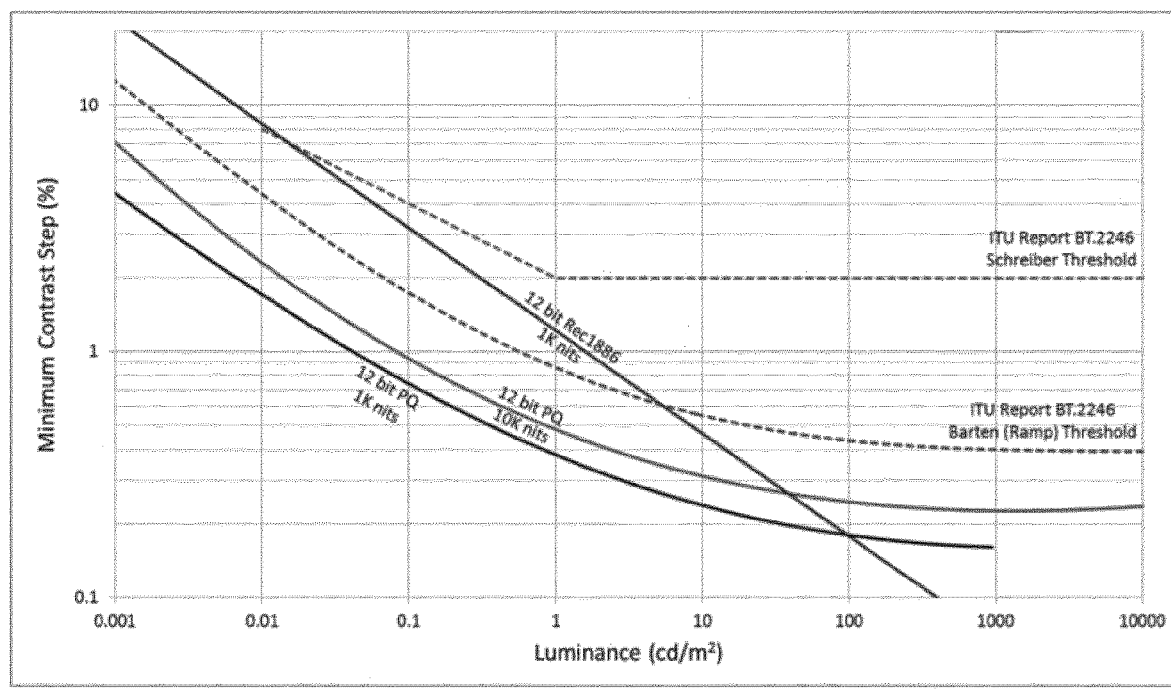
FIG. 7 shows a 12 bit Rec1886 gamma curves with peak luminances of 100, 1000, and 10,000 cd/m2.

PQ Curve or Perceptual Quantizer Curve. FIG. 7.

This standard, introduced by Dolby™ has been published by SMPTE entitles SMPTE ST 2084. It defines a transfer function that allows for the display of high dynamic range (HDR) video with a luminance level of up to 10,000 cd/m2 and can be used with the Rec. 2020 color space. PQ is a non-linear electro-optical transfer function (EOTF).

FIG. 7 is shown in the following publication, from *SMPTE Meeting Presentation* "Perceptual Signal Coding for More Efficient Usage of Bit Codes", which further describes that "the ITU-R Rec. BT.18861 EOTF for television, commonly referred to as "gamma encoding", is often said to be perceptually linear. A recent ITU report on Ultra-High Definition Television (UHDTV) (Report ITU-R BT.2246) which used a scaled Barten contrast sensitivity function, called "Barten (Ramp)", along with an alternative threshold function by Schreiber to illustrate how the ITU-R Rec. BT.1886 EOTF for HDTV behaved similarly to human perception, and was near or below visual detection thresholds for 10 and 12 bit implementations. Though this is roughly the case for a gamma curve with a peak level of 100 cd/m2 (or 100 nits) as shown in FIG. 1, when higher peak luminance levels are used the 12 bit gamma curve quickly rises above both the Barten and Schreiber thresholds, suggesting that it will become likely to show visible quantization artifacts—especially at the dark end of the luminance range. Though the system precision could be increased by using a higher bit depth, legacy infrastructures would be difficult to push beyond 12 bits. In fact most live production and broadcast environments still operate at the 10 bit level, so a system which could provide increased performance at these common bit depths would be ideal."

Figure 8:
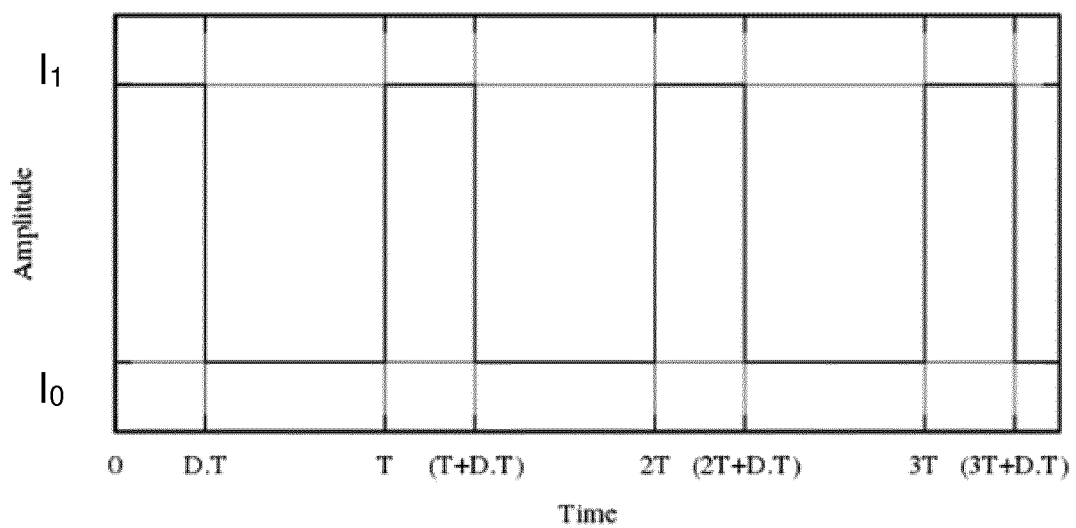
FIG. 8 shows an example of a rectangular pulse wave.

PWM (Pulse-Width Modulation). Pulse-width modulation uses a rectangular pulse wave whose pulse width is modulated resulting in the variation of the average value of the waveform. FIG. 8 shows an example of such a rectangular pulse wave.

The square wave has a period T, a lower limit $I_0$ (typically 0 in our case), a higher limit $I_1$ and a duty cycle D. The duration of one pulse P (the time during which the signal is at its higher limit) is D/100*T (if D is expressed in %). For instance if D=50%, the duration of the pulse is ½ T.

Figure 9:
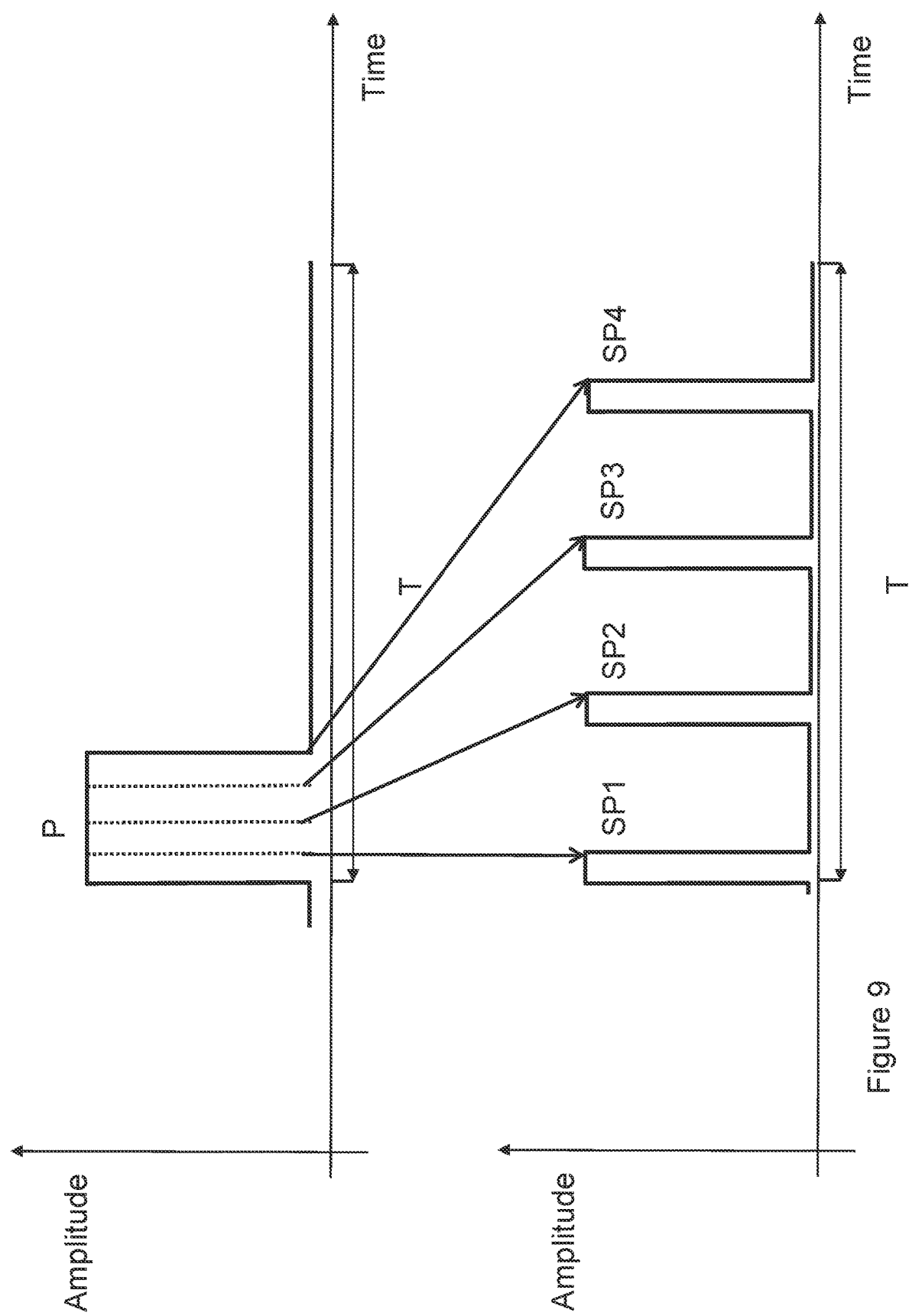
FIG. 9 shows a pulse over a period T divided into 4 sub-pulses SP1, SP2, SP3 and SP4 distributed across one period.

In some cases, the shape of the pulse P is modified as illustrated on FIG. 9. If the period T is "long" or of the same order of magnitude as the time constant of physical processes of importance, it may be advantageous to "split" the pulse into several sub-pulses that are distributed throughout one period of the wave. In FIG. 9, one period T has been divided into 4 sub-pulses SP1, SP2, SP3 and SP4 that have been distributed across one period. Depending on the application, it may be desirable to divide one period in more than 4 intervals.

In digital systems, the duration of a pulse is a multiple of a clock period $T_{cl}$. The minimum duty cycle that is possible to achieve with a given T and $T_{cl}$ is thus $T_{cl}/T$.

Figure 10A:
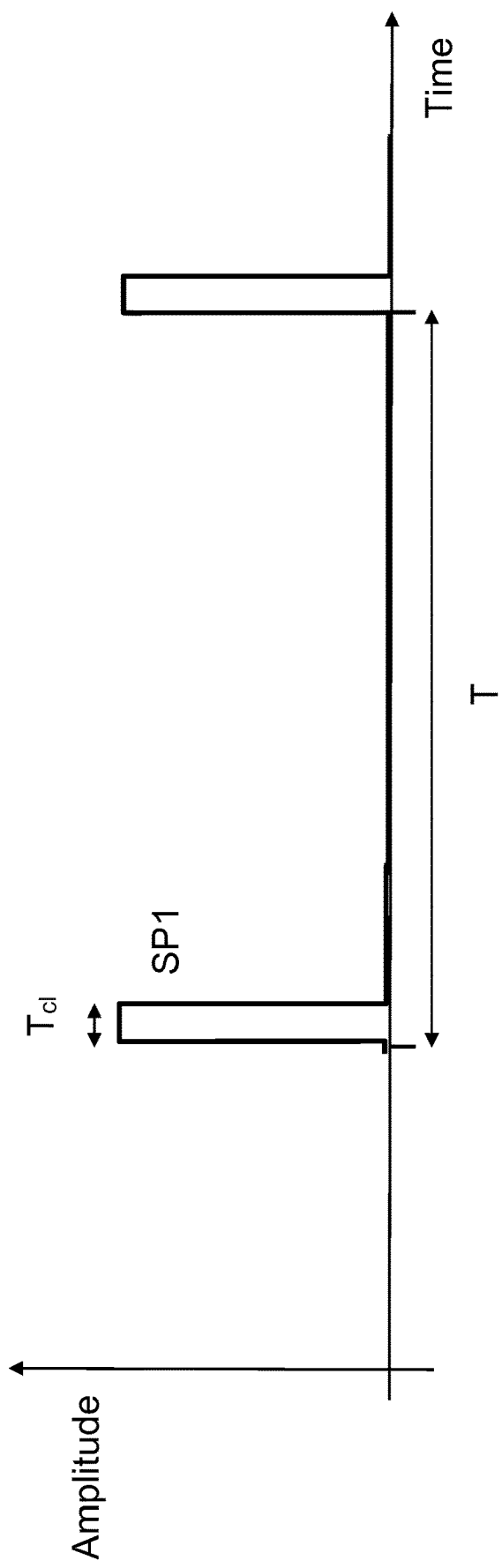
FIG. 10A shows a pulse width modulated signal with a duty cycle of $T_{cl}/T$.
Figure 10B:
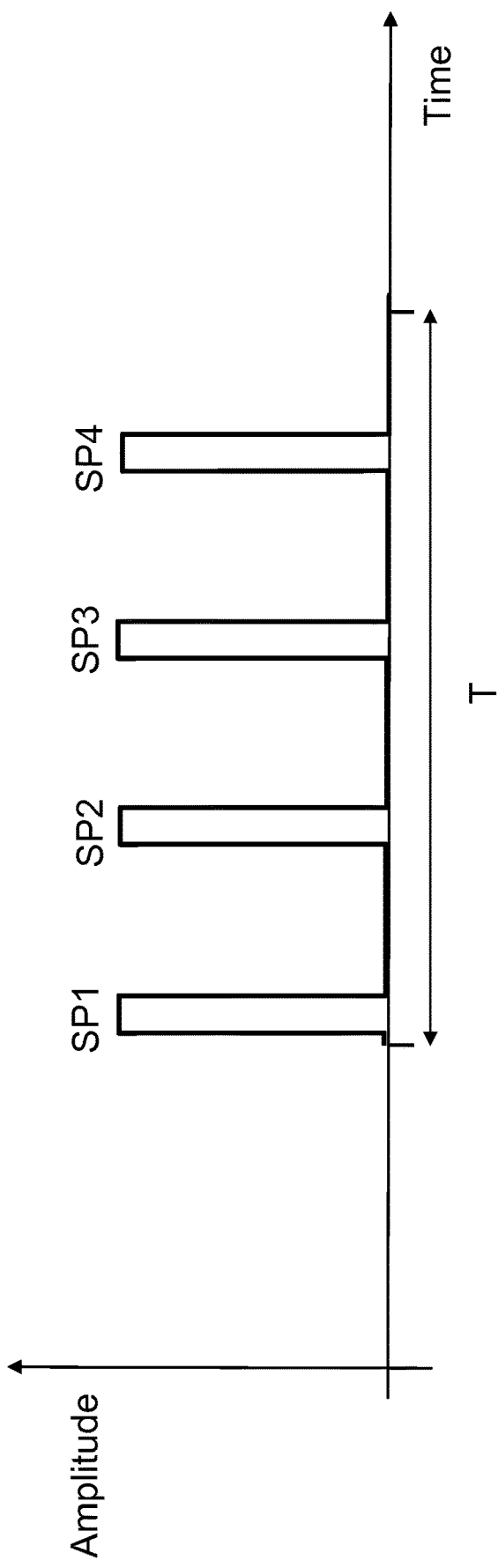
FIG. 10B shows a pulse P split in four sub-pulses, each sub-pulse taking place in one of the intervals in which the period T has been divided as illustrated on FIG. 10A.

If the duty cycle is set at its minimum value $T_{cl}/T$, the pulse width modulated signal will be as seen on FIG. 10A. If the duty cycle is further increased by $T_{cl}/T$, the pulse P can be split in two or more sub-pulses, each sub-pulse taking place in one of the intervals in which the period T has been divided as illustrated on FIG. 10B.

As the duty cycle further increases, each of the intervals is filled-up so that the total duration of the sub-pulses equals D*T.

With $I_0$=0, the average current <I> circulating in the diode is:

$<I>=I_1*D/100$ (with D expressed in %) or $<I>=I_1*D$ (with D expressed as a fraction of T, as a real number in the interval [0,1])

In a LED or OLED display, frames are displayed at a frequency of e.g. 60 Hz which corresponds to T=1/60 s. When LEDs or OLEDs are driven with a PWM signal, splitting a pulse into sub-pulses may reduce visible flickering (It is considered that anything below a frequency of 100 Hz can be seen by the human eye. Splitting a pulse into several sub-pulses can be seen as increasing the frequency by as much as N, with N being the number of intervals into which a period is divided).

Even though in those cases, the waveform of the current may not be strictly that of a PWM signal, nevertheless reference will be made to PWM when discussing the LED or OLED current driving scheme.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In the present invention, the input image data, representing images to be displayed in successive frames, to drive an active matrix display having pixels that include a drive transistor and a light emitting device. This means there are $(2^n)^3$ colors. It also means the maximum display luminance is divided by $2^n$ steps and this is thus the smallest luminance possible that can be display if a linear Electro-Optical Transfer Function is used.

These n bits are given to a LUT where an EOTF can be implemented. The output of this LUT is also limited in the number of bits (m). This limitation is set by the hardware of the display.

As discussed earlier, the duration $T_{cl}$ of the shortest sub-pulse width will determine the bit depth or number of brightness levels for the LEDs of a LED display.

For instance, once the duration T of a frame is known, the maximum number of different values for the duty cycle D is: $T/T_{cl}$. If T=1/60 s and $T_{cl}$ is 254 ns, the maximum number of brightness levels N is 65616 which is slightly more than $2^{16}-1$. In other words, this particular choice for T and $T_{cl}$ is compatible with a 16 bit LED or OLED driver.

The lowest non-zero level of brightness will be achieved with a PWM signal as represented on FIG. 10A.

If the duration of the shortest sub-pulse has a lower boundary that is higher than $T_{cl}$ such as 254 ns, it will be impossible to use a certain bit depth BD1 such as 16 bits and the number of brightness levels that can be achieved with a constant value for the current pulse amplitude will be less than the maximum number of bits $2^{BD1}-1$ such as $2^{16}-1$. If the number of bits is limited to a lower level BD2 such as 12 bits then $T_c$ will be limited such as $T_{cl} \approx 4$ µs (or less) with T=1/60 s.

To be able to achieve the same brightness with $T_{cl} \approx 4$ µs as with 254 ns, the maximum amplitude of the current pulse $I_{Max}$ must be reduced.

Thus, by reducing the current through the OLED or LED so that the brightness of the OLED or LED is 16 times lower, the brightness of a 16 bit display would be achieved. In other words, 4 bits extra are spared by dividing the current by a factor F which is not necessarily equal to 16 (because of the non-linear relation between the forward current in the LED or OLED and the resulting luminance). Due to the non-linearity of the current through the LEDS or OLEDs and the Luminance of the LEDs or OLEDs, the ratio between I_min and I_max is not equal to 16. To obtain a ratio of L_min/L_max=1/16 one option is to measure the optical output of a LED or OLED display to determine which currents I_min and I_max provide this luminance ratio. The measurement can be made using displayed patterns on a set of pixels, on a tile of a tiled display, or on the complete tiled display. The patterns can be Barten patterns.

More generally, according to the present invention, if the input image data is encoded with BD1 bits, each input image is converted to a (BD2+1)-bit digital image, wherein BD2<BD1, by truncating, for each pixel, the (BD1−BD2) least significant bits or most significant bits of the BD1-bit digital image, and encoding in the (BD2+1) bit an indication, each pixel of the (BD2+1)-bit digital image is then supplied with a first drive current (Imax) if the (BD1−BD2) least significant bits are truncated, and each pixel of the (BD2+1)-bit digital image with a second drive current ($I_{Min}$) if the (BD1−BD2) most significant bits are truncated, wherein the ratio of the first drive current ($I_{Max}$) to the second drive current ($I_{Min}$) is such that it results in a brightness ratio of 2^(BD1−BD2), and wherein the indication provides information on the drive current to be used.

On the other hand, with that new value for the current pulse amplitude $I_{Min}$, the maximum brightness will be 16 times lower than what was the case with the original value for $I_{Max}$. It is assumed throughout the description that the ratio of $I_{min}$ to $I_{Max}$ is equivalent to the ratio of brightness of the LEDs or OLEDs. However, this is not the case in practice. This brightness ratio of the low current and high current is in the present example 1/16. Due to the efficiency of the LED or OLED (brightness<→current), the current ratio ($I_{Max}$<→$I_{min}$) does not have a 1/16 ratio. A ratio of about 1/10 has been used in the examples shown.

In a first aspect of the invention, the desired range of brightness is achieved with less bits (e.g. BD2 rather than BD1 such as 12 bits i.o. 16 bits) by using a first current value $I_{max}$ as the maximum amplitude for current pulses when a LED or OLED must reach a higher range of brightness and a second, lower, current value $I_{min}$ as the maximum amplitude for current pulses when a LED or OLED pixel is used in a lower range of brightness.

Instead of having to send BD1 such as 16 bits of information concerning the average current through a LED or OLED, BD2 such as 12 bits can be used to encode the average amplitude of the current through a LED or OLED (by means of e.g. a duty cycle) and 1 bit to encode which of $I_{max}$ or $I_{min}$ must be used as amplitude for the current pulses. When the LEDs or OLEDs are driven with a Pulse Width Modulated current, the BD2 such as 12 bits can for instance be used to encode a duty cycle.

For instance, if the BD2 plus 1 bit such as the 13$^{th}$ bit is a logical 1, the current pulses will have the amplitude $I_{max}$ as illustrated on FIG. 11A. On the example of FIG. 11A, the duty cycle of 25% corresponds to a 12 bit sequence MSB=b11=0, b10=1, b9=0, b8=0, b7=0, b6=0, b5=0, b4=0, b3=0, b2=0, b1=0, b0=0=LSB (with b11 being the MSB and b0 the LSB).

If the 13$^{th}$ bit is a logical 0, the current pulses will have the amplitude $I_{Min}$ as illustrated on FIG. 11B. On the example of FIG. 11B, the duty cycle of 25% corresponds to a 12 bit sequence b11=1, b10=0, b9=0, b8=0, b7=0, b6=0, b5=0, b4=0, b3=0, b2=0, b1=0, b0=0 (with b11 being the MSB and b0 the LSB).

In embodiments of the present invention, the data sent to a LED or OLED display according to these embodiments of the present invention can still be encoded and stored with BD1 i.e. 16 bits (per color) but it is truncated before being sent to the LED or OLED current driver.

Figure 12:
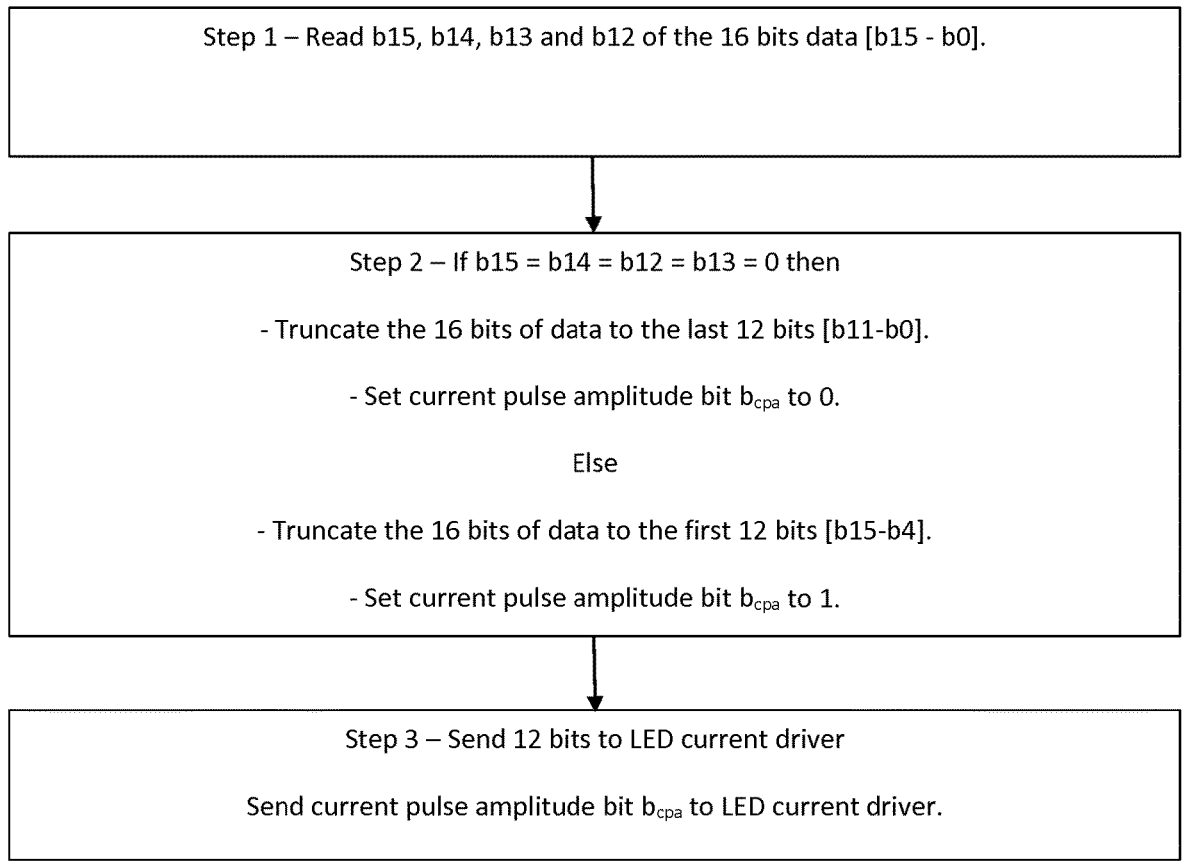
FIG. 12 shows which steps are taken to truncate the BD1 e.g. 16 bits according to embodiments of the present invention.

FIG. 12 shows which steps are taken to truncate the BD1 e.g. 16 bits according to embodiments of the present invention.

In an embodiment of the present invention, the values of the first S most significant bits such as four most significant bits and/or the L least significant bits such as four least significant bits can indicate whether the corresponding LED or OLED has to be driven so as to reach a brightness which lies in the highest or lowest range of brightness.

A comparator can be provided to compare the first S or four most significant bits of the BD1 such as 16 bits (b15, b14, b13 and b12).

If these S or four bits are zero, they are truncated. This leaves a BD2 bit word such as 12 bit word [b11–b0]. The current pulse amplitude bit $b_{cpa}$ (the BD2 plus 1 bit or "13$^{th}$" bit) is set to zero, indicating that the amplitude of the current pulses is $I_{Min}$, which corresponds to the lowest range of brightness.

Figure 13:
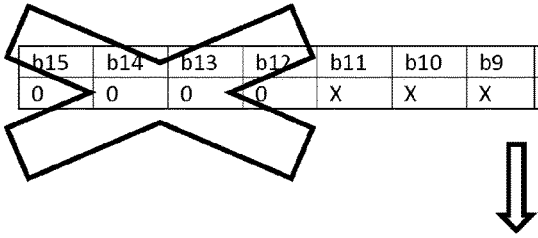
FIG. 13 shows the truncation of four of the most significant bits and the addition of the CPA bit according to embodiments of the present invention.

FIG. 13 shows the initial BD2 such as 16 bit word and the result of the truncation to BD2 such as 12 bits as well as the state of the current pulse amplitude bit when the first S such as 4 most significant bits b15, b14, b13 and 12 are 0.

If any of the first S such as four most significant bits is different from zero, which indicates the LED or OLED is to be driven in the higher range of brightness, the L such as 4 least significant bits (b3, b2, b1 and b0) of the 16 bits word are truncated. This leaves a BD2 such as 12 bit word [b15-b4]. The current pulse amplitude bit $b_{cpa}$ (BD2 plus 1 bit or the "13$^{th}$" bit) is set to 1, indicating that the amplitude of the current pulses is $I_{Max}$, which corresponds to the highest range of brightness.

Figure 14:
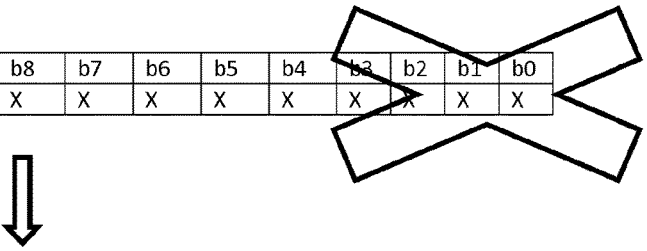
FIG. 14 shows the truncation of four of the least significant bit and the addition of the CPA bit according to embodiments of the present invention.

FIG. 14 shows the initial BD1 such as 16 bits word and the result of the truncation to BD2 such as 12 bits as well as the state of the current pulse amplitude bit when at least one the first S such as 4 most significant bits b15, b14, b13 and 12 is 1 (this is symbolized by the state Y on FIG. 12).

On FIGS. 13 and 14, the state X means 1 or 0 and indicates that the truncation is done independently of the value of those bits in the X state.

Switching between low current and high current can be implemented as follows:

Between 0-4095 the pixels are driven with low current (low light (LL) in following table),
Between 4096-65535 the pixels are driven with high current in 12 bit steps (high light (HL) in following table).

So if a 16-bit value image is received and bits 15-12 are zero, the lower 12 bits are chosen to display with the low current. If bits 15-12 are not zero, the top 12 bits are chosen to display with the high current:

TABLE 1

| Low lights: | | | | | | | | | | | | | | | |
| --- | --- | --- | --- | --- | --- | --- | --- | --- | --- | --- | --- | --- | --- | --- | --- |
| b15 | b14 | b13 | b12 | b11 | b10 | b9 | b8 | b7 | b6 | b5 | b4 | b3 | b2 | b1 | b0 |
| High lights: | | | | | | | | | | | | | | | |
| b15 | b14 | b13 | b12 | b11 | b10 | b9 | b8 | b7 | b6 | b5 | b4 | b3 | b2 | b1 | b0 |

Figure 16A:
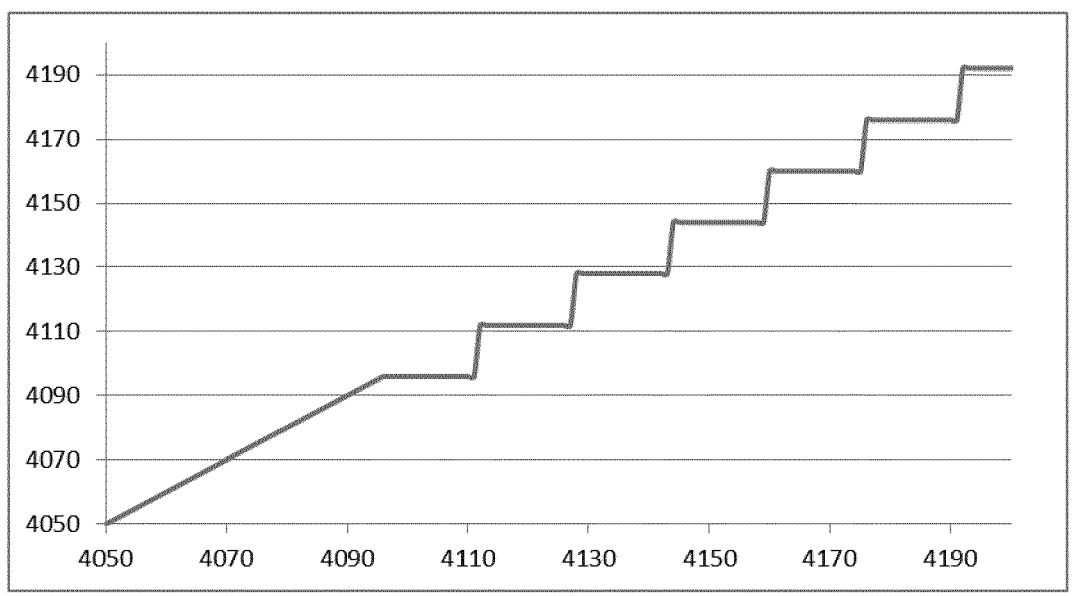
FIG. 16a shows the transition from 12 bit with the low current to the 12 bit with the high current according to embodiments of the present invention.

In the high current implementation, brightness steps of 16 are taken (due to the higher current), as illustrated on FIG. 16a.

It would be preferable if the change of steps from the lower current to the higher current is not visible by the human eye. For example, the Barten curve can be used to indicate whether this transition is visible. As described above, the Barten curve shows a threshold for visible brightness steps in function of global brightness. All values below the curve are not visible by the human eye.

Figure 16B:
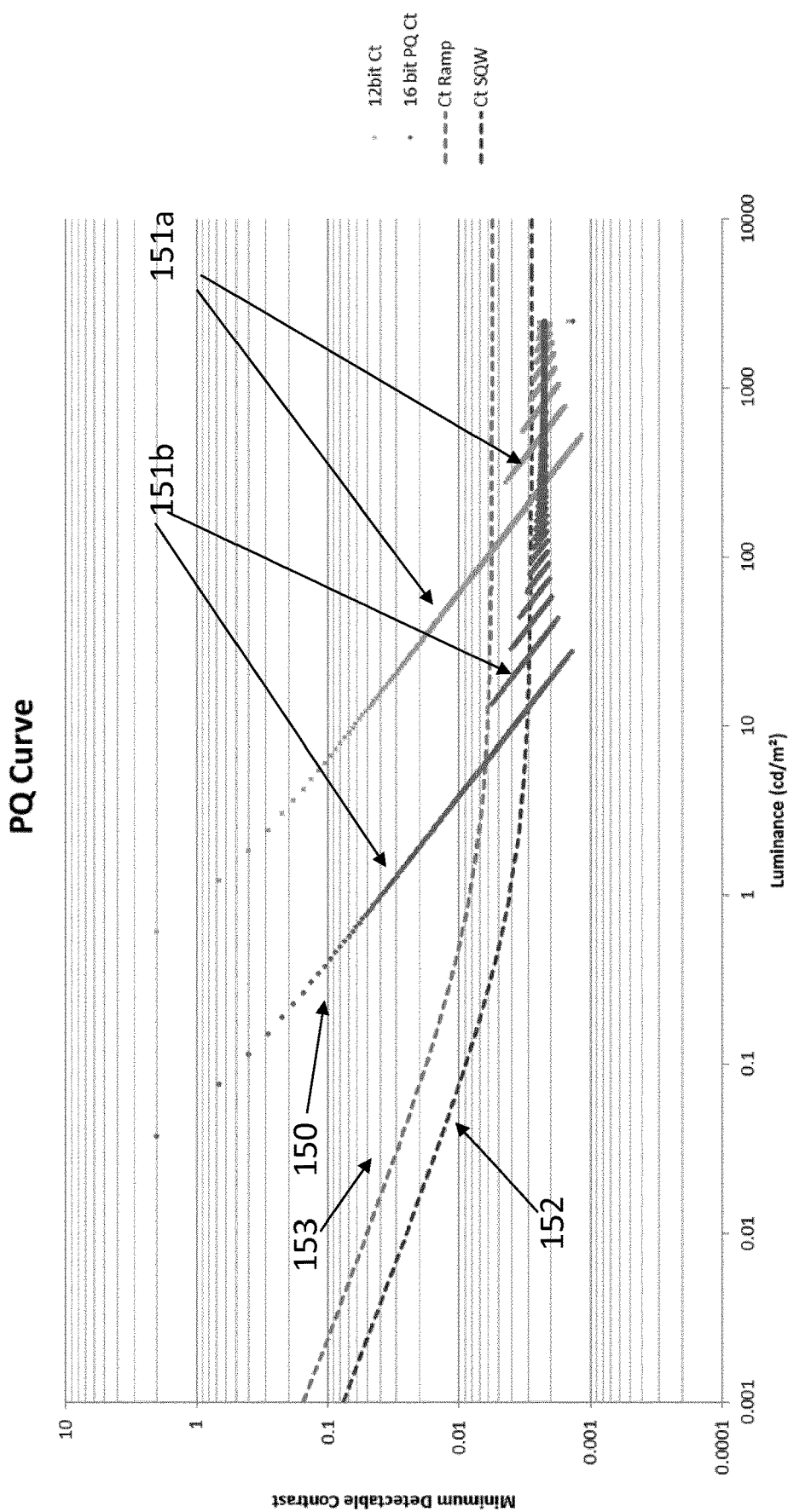
FIG. 16b shows the curve ΔL/L in function of L (luminance) when using a linear LED or OLED driver with 12 and 16 bit bit depth as well as the Barten curve for the ramp and the square wave pattern according to embodiments of the present invention.

A Barten Curve (for a square wave pattern and for a ramp pattern) are shown on FIG. 16b. It also shows the PQ curve (EOTF) for a 16 bit display and a 12 bit. Increasing the number of output bits, from BD2 to BD1 or 12 to 16, shifts the curve towards a lower minimum detectable contrast when increasing the number of output bits. This behavior is expected as the maximum luminance of the display is divided by a power of 2 more for a BD1 such as 16-bit encoding than a BD2 such as 12-bit encoding, and thus results in a smallest luminance step for a BD1 such as 16-bit encoding, which is less visible compared to a BD2 such as 12-bit encoding.

Different ways of performing the truncation can be implemented and each is included as an embodiment of the present invention.

Switching from $I_{min}$ to $I_{max}$ may be accompanied by visual artefacts. However, the truncation is preferably performed such that the transition from the lowest range of brightness determined by Imin to the highest range of brightness determined by Imax is as smooth as possible with respect to the human visual perception. The human visual perception model can be represented by a Barten ramp, or as described above, can be delimited by the gamma curve, or even more preferably by the PQ curve.

It appears that the luminance at which the transition from one reference current amplitude to the other happens will have a determining influence on whether or not the artefacts are too large, i.e. too noticeable by the human eye to be acceptable.

Indeed, when the amplitude of the current pulses is increased from $I_{min}$ to $I_{max}$, corresponding to luminances $L_{min}$ and $L_{max}$, one LSB corresponds to an increase in luminance that is N times higher (where $N=L_{max}/L_{min}$), or more generally, that is 2^(BD1-BD2).

The current (averaged over a period T) circulating through a LED or OLED is $<I>=D/100*I_{pulse}$ where $I_{pulse}$ is the amplitude of the current pulses (i.e. either $I_{min}$ or $I_{max}$).

If the duty cycle is increased by one LSB, the variation of current averaged over a period T circulating through a LED or OLED is $\Delta<I>=1/M*I_{pulse}$ where M is the number of duty cycle steps $\Delta D$ that can be encoded with a chosen number of bit. When 12 bits are used to encode the duty cycle, $\Delta<I>=1/4095*I_{pulse}$.

Let us assume that at a start a LED or OLED is driven with $I_{pulse}=I_{min}$ and then the duty cycle D is increased from 0 to 100% by steps of one LSB. The current will increase by steps of $\Delta<I>=1/4095*I_{min}$ until the duty cycle has reached 100% and $<I>=I_{min}$. After that, in order to further increase the luminance, the amplitude of the current pulses must be increased to $I_{max}$.

With N=16, and still encoding the duty cycle D with BD2 such as 12 bits, the duty cycle needed to have the same luminance (averaged over one period T) in the LED or OLED will be encoded as follows MSB=b11=0, b10=0, b9=0, b8=0, b7=1, b6=1, b5=1, b4=1, b3=1, b2=1, b1=1, b0=1=LSB.

Indeed, this code represents the number b11*2048+b10*1024+b9*512+b8*256+b7*128+b6*64+b5*32+b4*16+b3*8+b2*4+b1*2+b0*1=255. This encodes a duty cycle D=(255/4095)*100% ⅟16*100%.

The average luminance of the LED or OLED will be for BD1=16:

$$<L>=L_{max}*1/16$$

The amplitude Imax of the current pulses with corresponding luminance Lmax being 16 times higher than Lmin with the corresponding current Imin, equation (2) can be written as follows:

$$<L>=L_{max}*1/16=16*L_{min}*1/16=L_{min}.$$

From there on, with $I_{pulse}=I_{max}$, the current (averaged over one period T) increases by steps of $\Delta<I>=1/4095*I_{max}$ which is a step 16 times higher than with $I_{pulse}=I_{min}$.

Because the luminance step $\Delta<L>$ becomes larger by a factor N (16 in the present example), it can cause visual artefacts. The origin of the visual artefacts can be spatial or temporal. For example, the current increase in a LED or OLED from one frame to the other and corresponding to one LSB can be too high to be compatible with a standard like e.g. DICOM. The difference in luminance between two adjacent LEDs or OLEDs, the luminance difference of both LED or OLED corresponding to a single LSB, can be too high to be compatible with a standard like e.g. DICOM.

It is therefore advantageous to choose N such that the step in luminance L=N/4095*Lmax will correspond to a just noticeable difference (JND).

More generally, one will seek to have a just noticeable step in luminance corresponding to $N/(2^M-1)*L_{min}$ where M is the number of bits used to encode the duty cycle (or more generally, where $2^M-1$ is the number of duty cycle steps, and therefore luminance, between a minimum like e.g. 0% and a maximum like e.g. 100%).

As described above, different types of curves exist to model or to represent the contrast sensitivity in function of the luminance. From these models, look up tables can be derived in order to improve the computational time, i.e. to reduce it. For example, the Barten model, which takes into account the dependence of the contrast sensitivity in function of the screen luminance, field of view, spatial frequency of the image, etc. The Barten model is widely used and is referenced by many electronic imaging studies and standards. From this model, the PQ curve has been designed to provide a closer fit to the human visual response curve, as explained in the publication, *"Perceptual Signal Coding for More Efficient Usage of Bit Codes"*, SMPTE Meeting Presentation, 2012, Scott Miller, Mandi Newamabadi, Scott Daly.

Figure 15:
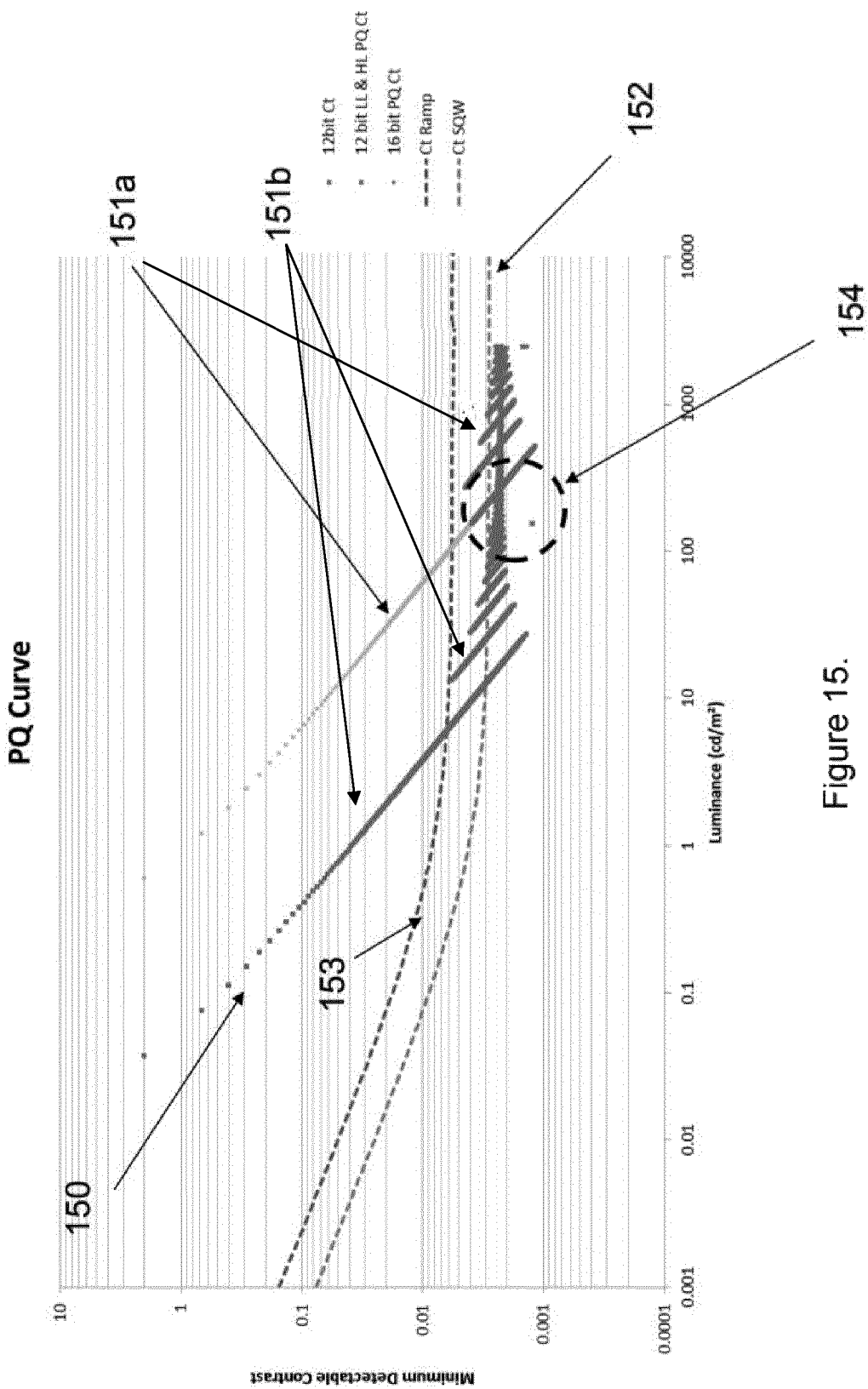
FIG. 15 shows the Barten curve for the ramp and a square wave pattern, and the curve showing how ΔL/L varies in function of L when using linear LED or OLED drivers limited to 12 and 16 bits bitdepths. Two curves are given for the 12 bit bitdepth case: a first one with the low current and a second one with high current according to embodiments of the present invention

FIG. 15 shows a Perceptual Quantizer Curve (representing the contrast sensitivity in function of the luminance).

The curve 150 shows the variation of contrast in function of the luminance obtained when driving the LEDs or OLEDs of a LED or OLED display with a linear current driver with a bit depth of 16 bits.

The curve 151a shows the variation of contrast in function of the luminance obtained when driving the LEDs or OLEDs of a LED or OLED display with the same linear current driver with a bit depth of 12 bits and the same amplitude for the current pulses used for the Pulse Width Modulation.

The curve 151b shows the variation of contrast with a bit depth of twelve bits obtained by truncating a 16 bits encoding according to the invention (i.e. using the 12 LSB when the 4 MSB are zero with a first amplitude $I_{min}$, for the current pulses and using the 12 MSB with a second amplitude $I_{Max}$ for the current pulses when at least one of the 4 MSBs is not zero). The curve 151b follows the curve 150 as long as the first amplitude $I_{Min}$ for the current pulses is used. Afterwards, as the second amplitude $I_{Max}$ is used for the current pulses, the curve $\Delta L/L$ stops at the end of 151b and starts to follow the curve 151a.

The curves 150, 151a and 151b shows how the contrast $\Delta L/L$ varies in function of L where L is the (average) luminance on the display.

The current is encoded with e.g. 12 bits. When the bit code increases by 1 LSB, the luminance increases by $\Delta L$ and the curves 150, 151a and 151b can be constructed point after point. At low luminance, $\Delta L/L$ varies more rapidly than at high luminance.

Compared to FIG. 16b, the 12 bit (or BD2) HL & LL are also shown in dark grey, superposed to the 16 bit PQ curve (150) and to the second part of the 12 bit PQ curve (151b, from 156 cd/m²). FIG. 15 shows the evolution of contrast sensitivity with a BD1 such as 12 bits encoding with $I_{cpa}=I_{min}$ (curve 151a) and with $I_{cpa}=I_{max}$ (curve 151b) where $I_{cpa}$ is the amplitude of the current pulses used for pulse width modulation. In this example, the BD2 bits such as 12 bits encoding has been described earlier, i.e., the 12 bits are used to encode the duty cycle of a pulse width modulated current through the LEDs or OLEs.

FIG. 15 also shows a Barten Curve (curve 152 corresponds to a square wave pattern and curve 153 to a ramp pattern).

So in the low lights the 16 bit PQ curve is exactly followed (by the curve 151a), however at a certain moment there is a jump to the HL driving (@156 cd/m²). When the amplitude of the current pulses (Imin and Imax) are chosen according to the present invention, this curve is still below the Barten, and thus the transition will not be visible (or not noticed).

Region 154 shown with a circle corresponds to the transition region, at 156 cd/m² from $I_{min}$ to $I_{max}$.

Every current step (corresponding to an LSB) is accompanied by a step in contrast sensitivity ($\Delta L/L$ where $\Delta L$ is the increase in luminance corresponding to an increase in current $\Delta<I>$ through a LED or OLED and L is the luminance corresponding to the average current $<I>$).

Steps in luminance below the Barten Curve are not noticeable. In particular, variation in luminance in the region 154 where the amplitude of current pulses varies from $I_{min}$ to $I_{max}$ is not visible.

Even though a step in luminance corresponding to one LSB increases by a factor N (with for instance N=16), the corresponding increase in luminance $\Delta L$ will not be noticeable if the transition takes place below the Barten curve.

In FIG. 15, the jump from $I_{Min}$ to $I_{Max}$ is done at a luminance of +−156 cd/m².

Figure 17A:
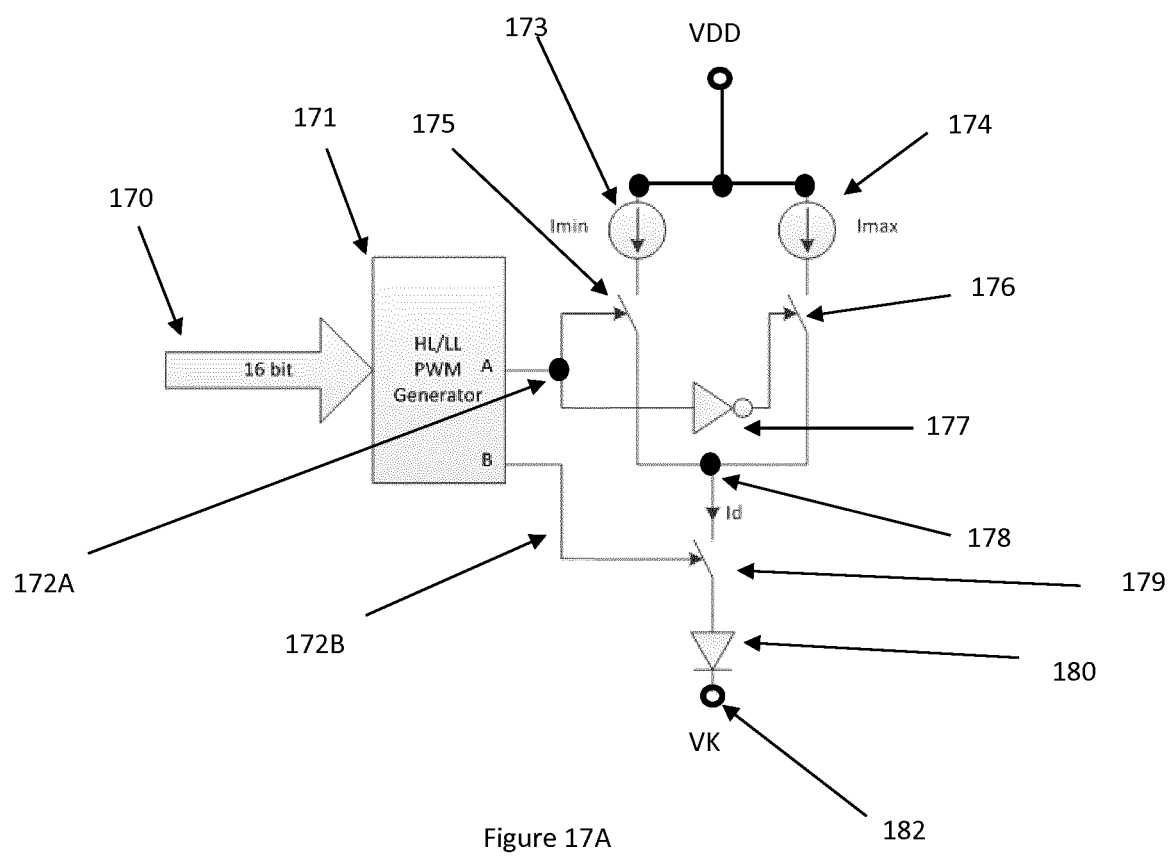
FIG. 17A shows a current source according to embodiments of the present invention.
Figure 18A:
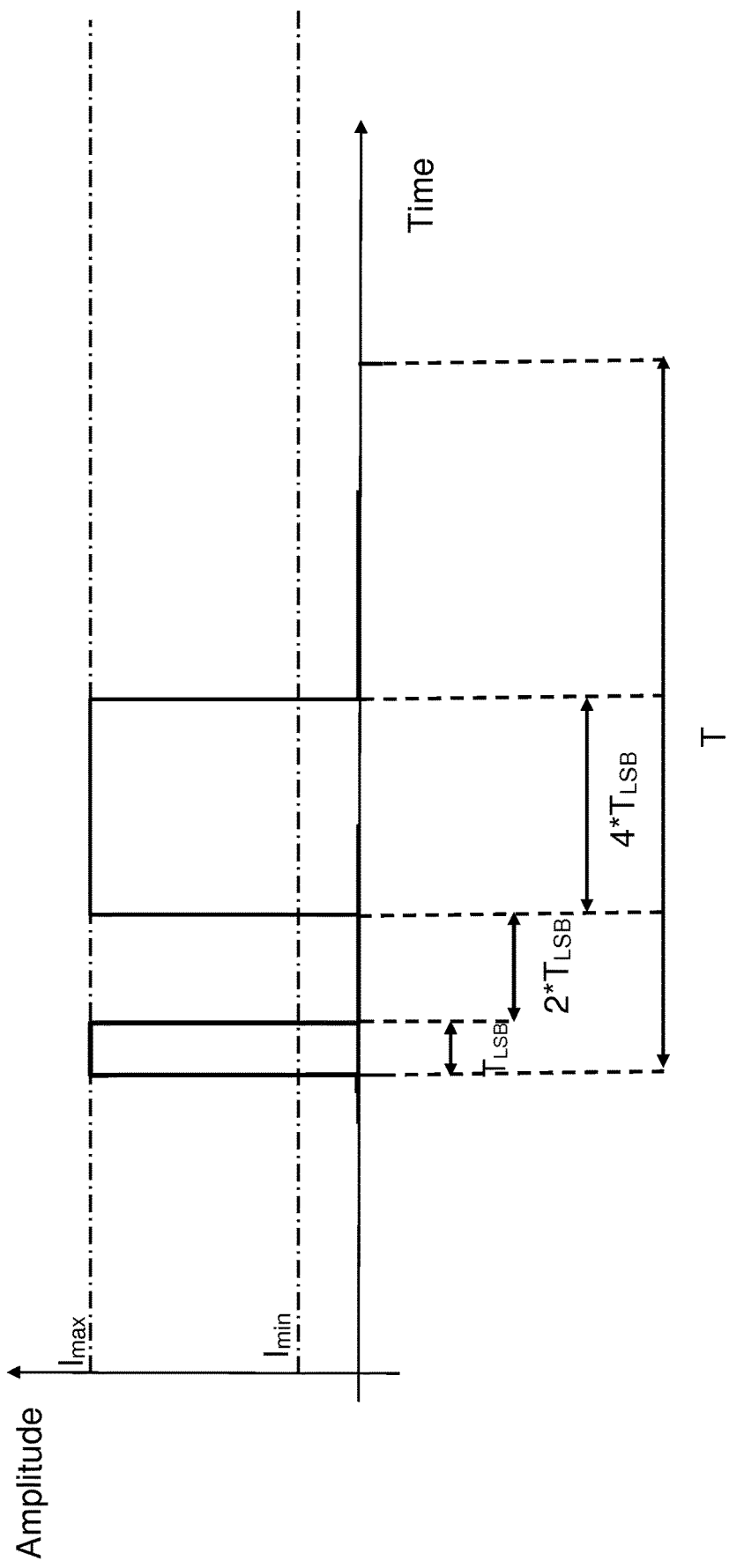
FIG. 18A illustrates the sum of all time intervals being equal to the PWM period T as used in embodiments of the present invention.
Figure 23:
FIG. 23 shows an example of modified transition from a first pulse current amplitude Imin to a second pulse current amplitude.

In the example of FIG. 23, the first 8 bits encoded are converted into a current by using a first current value Imin for the current DAC (cf FIGS. 17A and 18A). Instead of using the last 4 bits with Imin, bit 3, bit 2 and bit 1 are set to zero and bit 0 is realized with a current Imax corresponding to Lmax=N*Lmin (with N=e.g. 16 in our example). The total luminance generated by the LED or OLED is the same as if all bits had been set to 1.

An embodiment of a DAC that can realize a more gradual transition from a first current amplitude to a second current amplitude of a PWM driving system for an LED or OLED display will now be described. FIG. 17A shows an example of circuit that can implement the invention. In this or any other of the embodiments of the present invention a low pass filter can be used. However bearing in mind that brightness is the same as luminance but perceived by the human eye, the human eye acts as a low pass filter that averages the sequence of light pulses. So for the PWM driving pulses the brightness or the average luminance during one PWM period, can be filtered by the eye LPF (Low Pass Filter).

A sequence of bit encoding a desired current in a LED or OLED 180 is fed into a signal generator 171. The signal generator 171 generates a first signal 172A that is function of the sequence of bits. The first signal 172A determines which of the switches 175 or 176 is closed or open. When closed the first switch 175 connects a first current source 173 to a node 178. When closed the second switch 176 connects a second current source 174 to the node 178. The signal 172A can e.g. drive the first switch 175. The second switch 176 can be driven by the output of a logical inverter 177 which used the signal 172A as input.

The signal generator 171 also generates a second signal 172B that controls a third switch 179. The second signal 172B is used to modulate the current in the LED or OLED 180 according to a PWM scheme. When closed, the third switch 179 connects the LED or OLED 180 with the switches 175 and 176. When the third switch 179 is open, the current in the LED or OLED 180 is zero. When the third switch 179 is closed, the current in the LED or OLED 180 is equal to the current $I_{min}$ generated by the first current source 173 when the first switch 175 is closed and the second switch 176 is open. When the third switch 179 is closed, the current in the LED or OLED 180 is equal to the current $I_{max}$ generated by the second current source 174 when the first switch 175 is open and the second switch 176 is closed. The anode of the LED or OLED 180 is connected to the third switch 179 and the cathode of LED or OLED 180 is connected to a cathode node 182 at a potential Vk. The signal generator can e.g. be implemented on an FPGA or an ASIC.

The second signal 172B can be generated in different ways. In one particular embodiment, For instance, the LSB of the truncated bit sequence can correspond to a duration $T_{LSB}$ such $T_{LSB}$ is equal to e.g. a frame rate divided by $(2^n-1)$ where n is the number of bits of the truncated bit sequence. If bit B0 (the LSB) of the truncated bit sequence is 1, the signal generator sets the second signal 172B "high" to close the third switch 179 and allow current to flow through the LED or OLED 180 during a time equal to $T_{LSB}$. If the second bit B1 is 0, the signal generator sets the second signal 172B "low" to open the third switch 179 and prevent current from flowing through the LED or OLED 180 during a time equal to $2*T_{LSB}$. If the third bit B2 is 1, the signal generator sets the second signal 172B "high" to close the third switch 179 and allow current to flow through the LED or OLED 180 during a time equal to $4*T_{LSB}$. For the $n^{th}$ bit $B_N$, the time interval during which the second signal 172B is set to H or L in function of BN is equal to $2^{(N-1)}*T_{LSB}$. The sum of all the time intervals is equal to the PWM period T. This is illustrated on FIG. 18A.

Figure 19A:
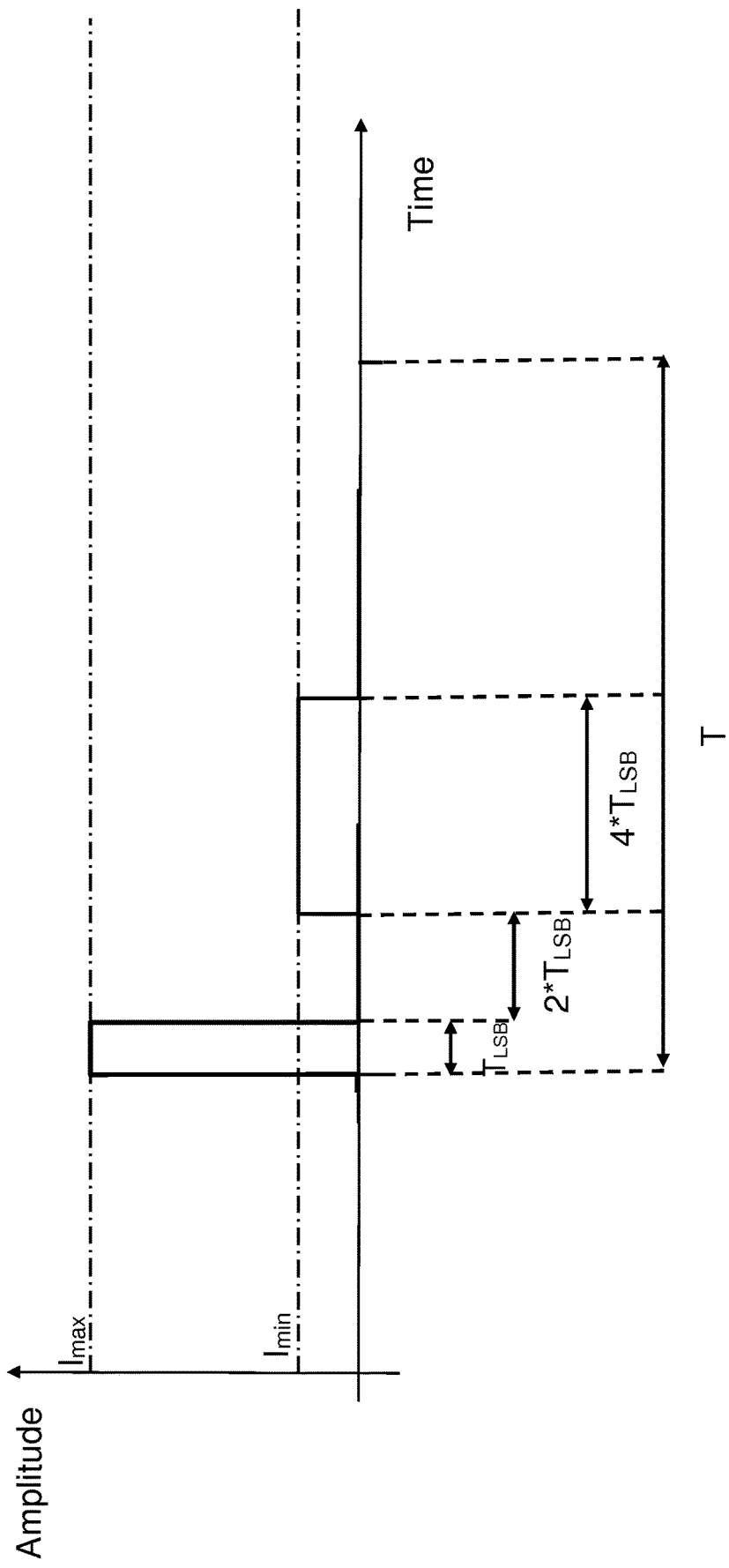
FIG. 19A illustrates the amplitude of the current is $I_{max}$ during the time interval TLSB corresponding to the LSB B0 and the amplitude of the current is $I_{min}$ during the time interval 4*TLSB corresponding to the third bit B2.

When the PWM signal is generated as described above, it is even possible to change the state of the first signal 172A (and hence the amplitude of the PWM signal) for any of the bits Bi of the truncated bit sequence. This is illustrated on FIG. 19A where the amplitude of the current is $I_{max}$ during the time interval TLSB corresponding to the LSB B0 and the amplitude of the current is $I_{min}$ during the time interval 4*TLSB corresponding to the third bit B2.

Let us now illustrate how a display designer will determine the amplitude of $I_{Min}$ and Imax for a circuit as illustrated on FIG. 17A.

Let us say that that the display must have a maximum luminance of 2500 cd m$^{-2}$. The image data is 16 bits per pixel (per color) per frame. For the reasons discussed earlier, the chosen bit depth is 12 bits.

Based on industrial know-how, LED or OLED characteristics (a.o. the optical power in function of the forward current in the LED or OLED) and/or a current simulator (that in its simplest form can be a look-up table where measurements of L in function of the current are given), the forward current $I_{Max}$ required to achieve the required $L_{Max}$ can be determined. This is done for each color i.e. one determines an $I_{MaxRed}$ for the red LEDs, $I_{MaxGreen}$ for the green LEDs and $I_{MaxBlue}$ for the blue LEDs). For the sake of clarity the distinction will be ignored. Once this is known, the curve $\Delta L/L$ can be computed for L varying from zero to $L_{Max}$. L can be computed for each step of current (each step of current corresponding to an increase of duty cycle equal to TLSB), $\Delta L$ can be computed accordingly. This is illustrated in table 2.

Figure 25:
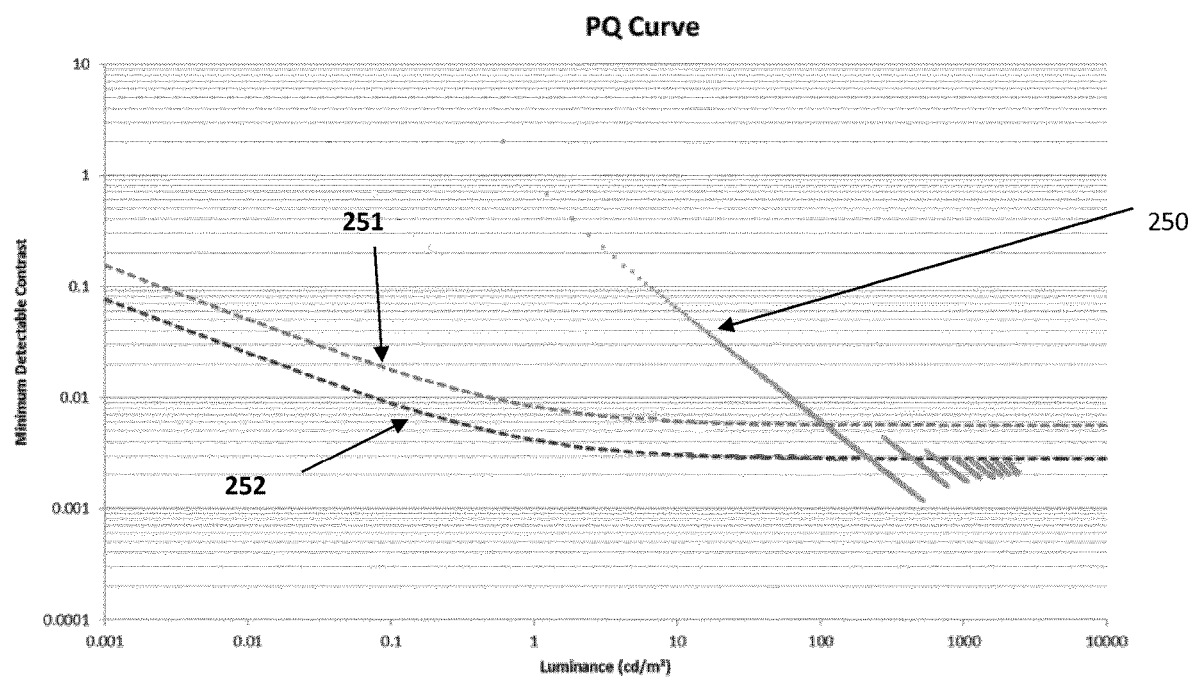
FIG. 25 shows ΔL/L in function of L as well as PQ curves e.g. Barten curve for a ramp and Barten curve for a square wave.

With the data in table 2, the curve 250 representing $\Delta L/L$ in function of L can be traced as illustrated on FIG. 25. Also shown on FIG. 25 are the PQ curves 251 (Barten curve for a ramp) and 252 (Barten curve for a square wave).

Figure 28:
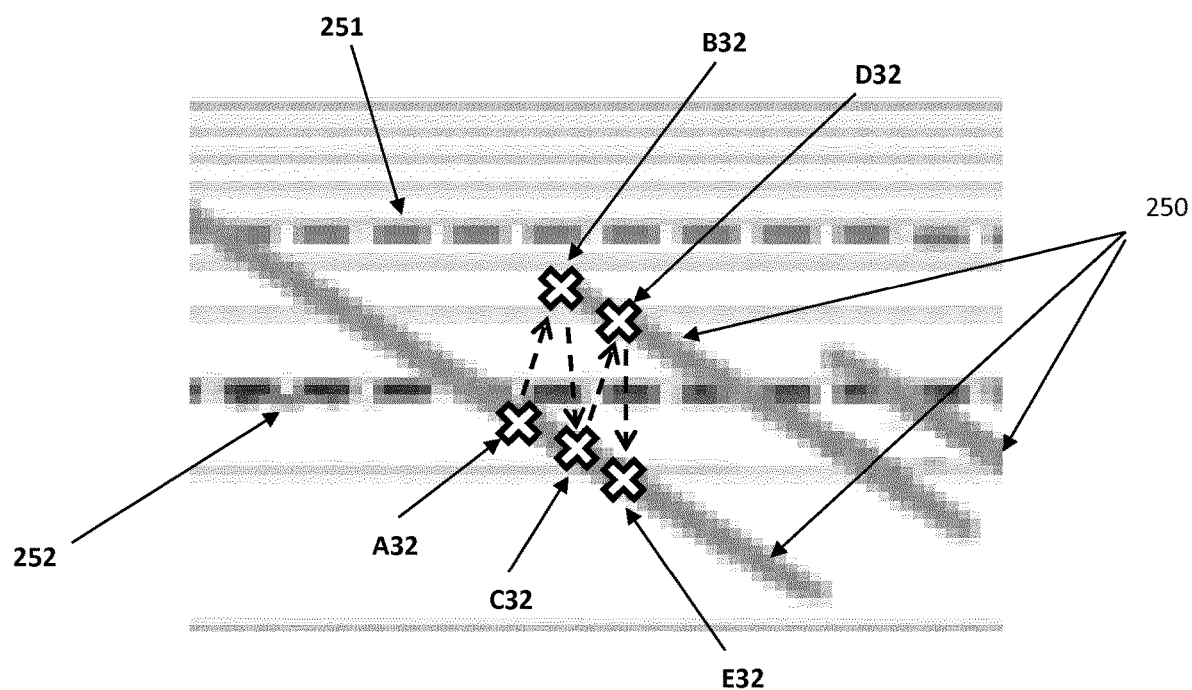
FIG. 28 shows a detail of FIG. 25.

FIG. 28 shows a close up of curve 250 of FIG. 25. Because of the non-linearity and because the current (hence the luminance) is increased stepwise (one LSB at a time), there are discontinuities. Contrary to appearances, the function $\Delta L/L$ is not multivalued. This becomes evident when one looks at the jumps from point A32 to point B32, from point B32 to point C32 etc. . . . in FIG. 28 that correspond to a single LSB increase in duty cycle each time.

With that curve of value of L for which the curve 250 is below a Barten curve is chosen. The designer or the display still has some freedom to choose the Luminance below the Barten curve. Depending on the performance requirements, one can chose a luminance such that the curve $\Delta L/L$ is between the curve 251 and the curve 252 or below the curve 252. In this case, for instance, the value of L can be chosen such that $\Delta L/L$ is below the aArten curves $L_{Tr}$=107 cd m$^{-2}$. As was done with Lmax, the display designer can determine the forward current $I_{Tr}$ required to achieve a luminance $L_{Tr}$=107 cd m$^{-2}$.

Knowing this, a curve $\Delta L/L$ can be traced as was done previously. This is illustrated in Table 3. L' will be used for the luminance merely to avoid a confusion between Table 2 and Table 3.

Figure 26:
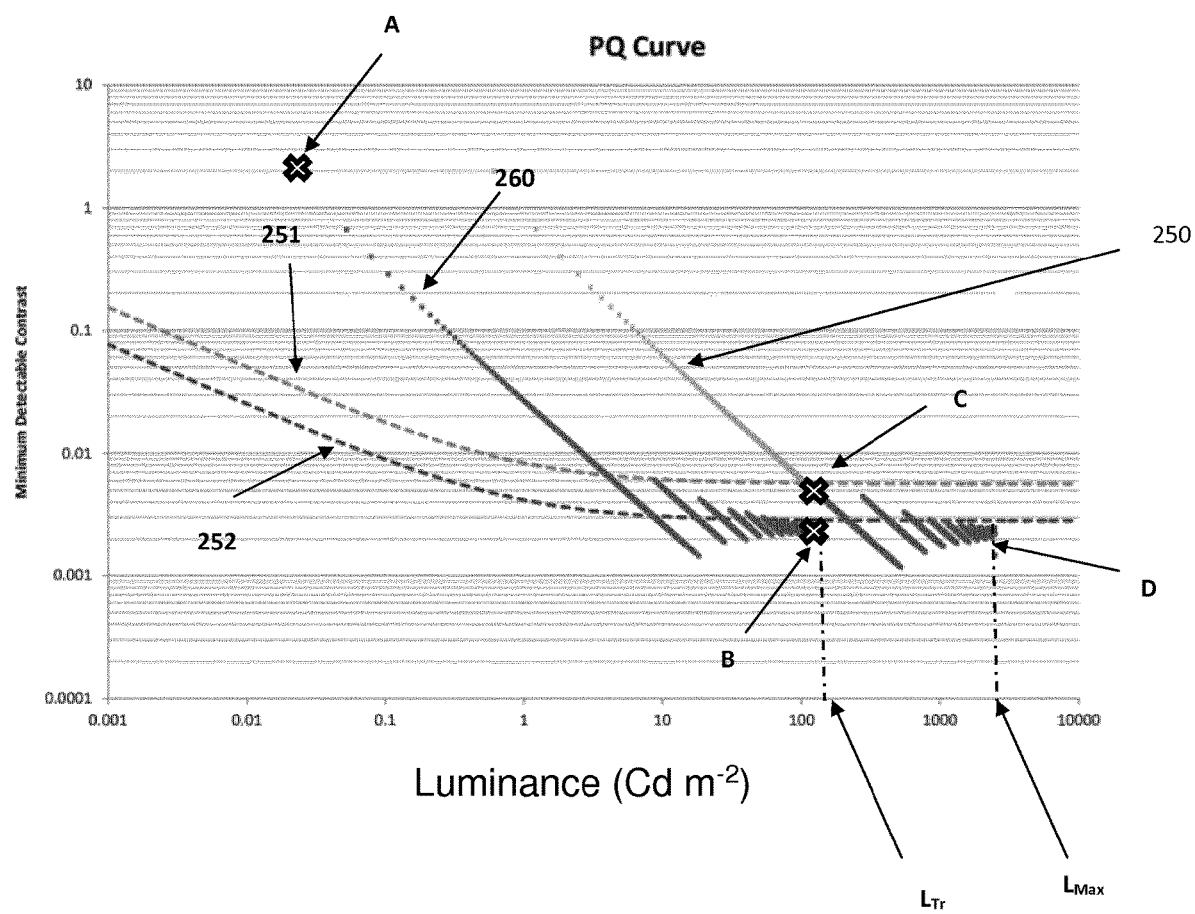
FIGS. 26 and 27 show the curves ΔL/L obtained with $I_{Tr}$ and $I_{Max}$ for the amplitude of the current pulses. This visualizes what happens when the duty cycle increases and when the amplitude of the current pulses is increased from $I_{Tr}$ to $I_{Max}$.

FIG. 26 shows the curves $\Delta L/L$ obtained with $I_{Tr}$ (curve 260) and $I_{Max}$ (curve 250) for the amplitude of the current pulses.

FIG. 26 allows us to visualize what happens when the duty cycle increases and when the amplitude of the current pulses is increased from $I_{Tr}$ to $I_{Max}$.

Starting from point A, the duty cycle of the PWM signal is increased (one LSB at a time). The luminance L increases and the ratio $\Delta L/L$ decreases. Around point B (i.e. in the vicinity of L=LTr), the ratio $\Delta L/L$ is constrained under the Barten curve 252. Once the average current in the LED or OLED has reached IT, the luminance cannot be increased anymore on the curve 260. The curve 260 corresponds the "Low Light" or LL mode and the current $I_{Tr}$ corresponds to the current $I_{Min}$ described previously. If it is desired to increase the luminance further, one can start using pulses with the amplitude $I_{Max}$ i.o. $I_{Min}$.

The duty cycle D is set at a value D0 such that $D*I_{Max}$ is as close as possible (ideally equal to) $I_{Min}$. This is now on curve 250, below the Barten curve 251 which means that any variation of luminance caused by a slight variation of the forward current during the transition from IMin to IMax (for the amplitude of the current pulses) is not noticeable. The ratio ΔL/L jumps from point B on curve 260 to point C on curve 250.

When the duty cycle is further increased from D0 to 1, the ratio ΔL/L varies along the curve 250 from the point C to the point D. Since the duty cycle D0 is different from zero, it means that some of the bit combinations are not used.

Figure 27:
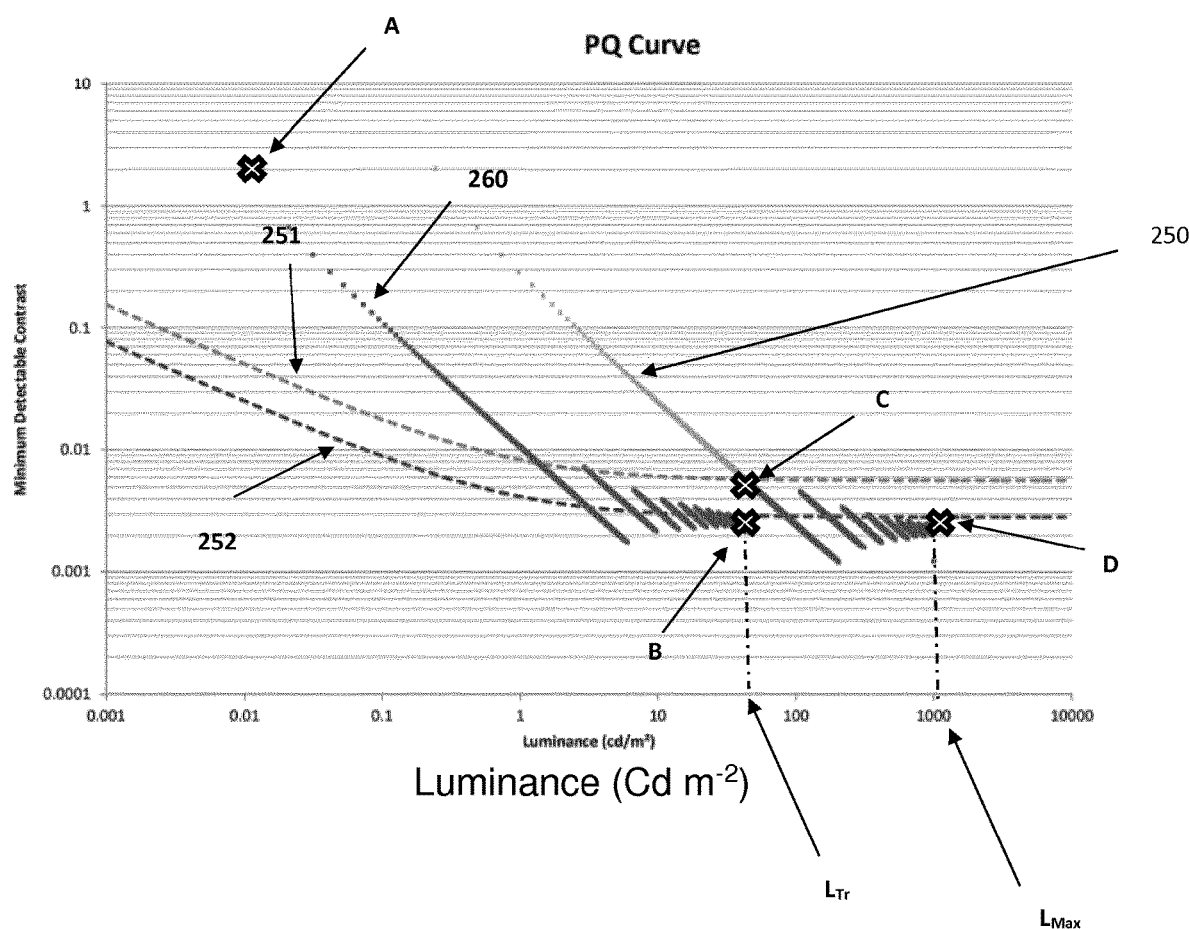

FIG. 27 shows similar curves. In that case, the requirement was $L_{Max}=1000$ Cd m$^{-2}$. In that example, LTR≈43 Cd m$^{-2}$.

Figure 17B:
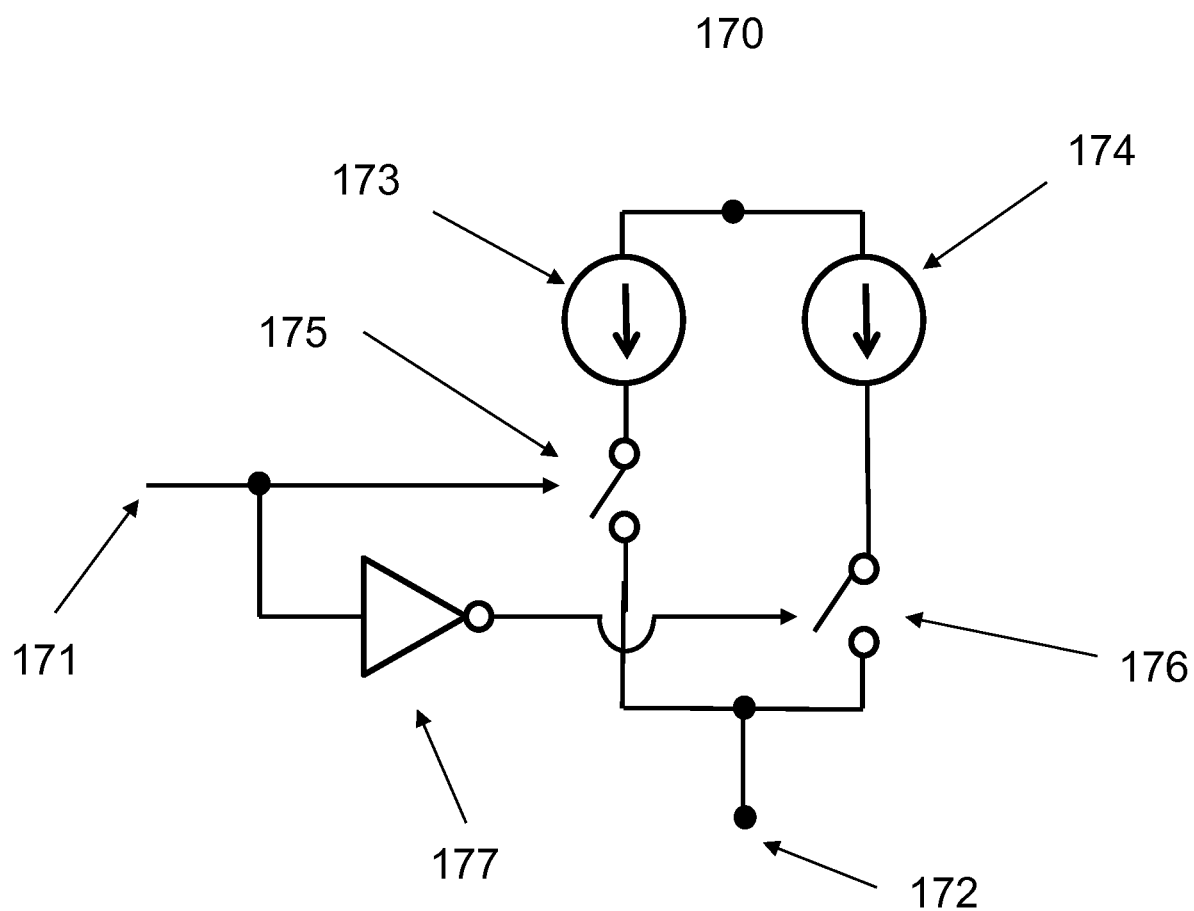
FIG. 17B shows another current source according to embodiments of the present invention.
Figure 18B:
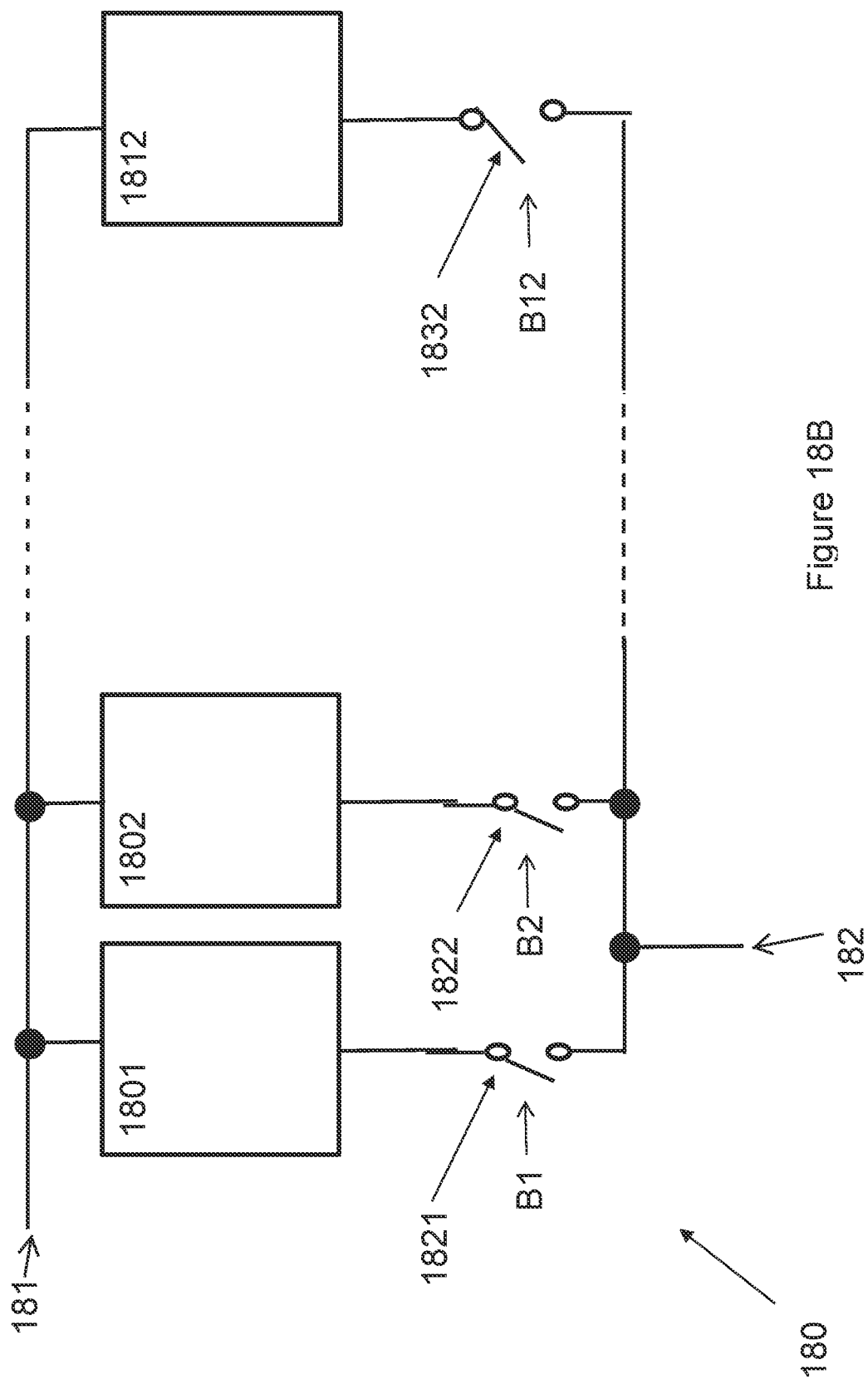
FIG. 18B shows a schematic view of 12 current sources 1 used to form a 12 bit current DAC according to embodiments of the present invention.

In the example of FIG. 23, the first 8 bits encoded are converted into a current by using a first current value Imin for the current DAC (cf FIGS. 17B and 18B). Instead of using the last 4 bits with Imin, bit 3, bit 2 and bit 1 are set to zero and bit 0 is realized with a current Imax=16*Imin. The total current generated by the DAC is the same as if all bits had been set to 1.

A further embodiment of a DAC that can optionally realize a more gradual transition from a first current amplitude to a second current amplitude of a PWM driving system for an LED or OLED display will now be described. In any of the embodiments of the present invention a low pass filter can be used. However bearing in mind that brightness is the same as luminance but perceived by the human eye, the human eye acts as a low pass filter that averages the sequence of light pulses. So for the PWM driving pulses the brightness or the average luminance during one PWM period, can be filtered by the eye LPF (Low Pass Filter). FIG. 17B shows a current source 170. This circuit can be e.g. implemented on an FPGA or an ASIC. The output current $I_{Out}$ of the current source 170 is function of an input signal 171. The input signal 171 is e.g. a binary signal (aka $b_S$ "bit Select"). The embodiment as shown in FIG. 17B shows an embodiment making use of dual current sources. The embodiment of FIG. 17B can be used as in FIG. 18B to show how to make a "regular" (i.e. not PWM) current DAC that can be used to drive the LED or OLED. However it can provide current to a PWM current driving unit. In principle, PWM driven pixels are known from the art and a PWM switch can be provided between the current sources and the LED or OLED, see e.g. FIG. 5 of US20170025064 which is incorporated by reference.

The output current is either $I_{Out}=I_{Ref1}$ if the $b_S$ is high (H) or $I_{Out}=I_{Ref2}$ if $b_S$ is low (L). The output current of the current source 170 is determined by which of switches 175 or 176 is closed by signal $b_S$. In the example of FIG. 17B, the signal $b_S$ drives the switch 175 and the signal NOT $b_S$ (obtained by inversion of signal $b_S$ by means of an inverter 177) drives the switch 176. For instance, if the signal $b_S$ is high, the switch 175 is closed while the switch 176 is open and a first current source 173 is connected to the output 172 of the current source 170. If the signal $b_S$ is low, the switch 175 is opened while the switch 176 is closed and a second current source 174 is connected to the output 172 of the current source 170.

In particular $I_{Ref2}=N*I_{Ref1}$.

Several current sources 170A, 170B, 170C etc. . . . like current source 170 can be used in parallel to form a DAC current.

In the example of FIG. 18B, 12 current sources 1801, 1802, . . . 1812 are used to form a 12 bit current DAC. The outputs of the 12 current sources are connected through a network 180 of switches 1821 to 1832 to a common node 182 where currents will be added. The switches 1821 to 1832 are controlled by 12 bits (B1, B2 . . . ) that encodes e.g. the amplitude of the current through a LED or OLED connected to the common node 182.

The reference currents $I_{Ref1}$ and $I_{Ref2}$ vary from one current source to the other as follows.

For the current source 1801 there is for instance $I_{Ref2\ 1801}=N*I_{Ref1\ 1801}=½I_{max}$.

For the current source 1802: $I_{Ref2\ 1802}=N*I_{Ref1\ 1802}=½ I_{Ref2\ 1801}=¼I_{max}$.

For the current source 1803: $I_{Ref2\ 1803}=N*I_{Ref1\ 1803}=½ I_{Ref2\ 1802}=⅛ I_{max}$ etc. . . . .

For the current source 1812: $I_{Ref2\ 1812}=N*I_{Ref1\ 1812}=½ I_{Ref2\ 1811}=½^{12} I_{max}$.

In the example of FIG. 18B, the input signal of every current source is connected to a single input bit 181 (it is therefore an example of current DAC that can be used in the first example of embodiment of the invention).

Figure 19B:
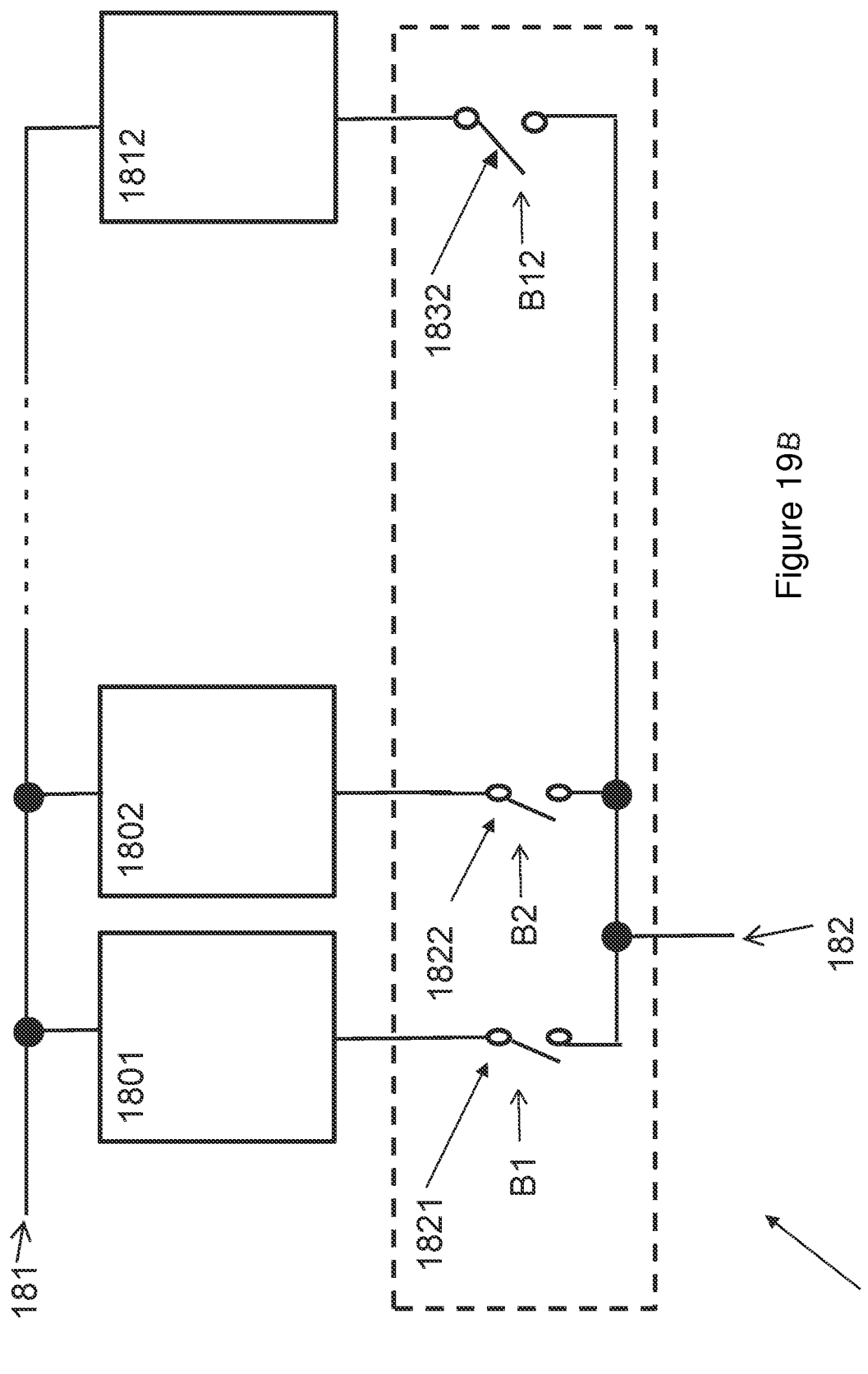
FIG. 19B resembles FIG. 18B wherein the input signal or control bit can be set to high or low independently for each current source according to embodiments of the present invention.

In FIG. 19B, the input signal or control bit can be set to high or low independently for each current source 1801, 1802 etc. . . .

In particular, the control bit can be determined by a control block 1901 in function of the bit code B[12:1] sent to the current DAC. The bit code B[12:1] is used both to control the state of switches 1821, 1822, . . . 1832 of the switch network 1833 and to determine the state of the select bit $b_S$ for each of the current sources 1801, 1802, . . . 1812.

For instance, the control block 1901 allows a less abrupt transition from a low current mode to a high current mode. For instance, the current DAC exemplified on FIG. 19B allows synthesizing a current corresponding to FIG. 16.

Figure 20:
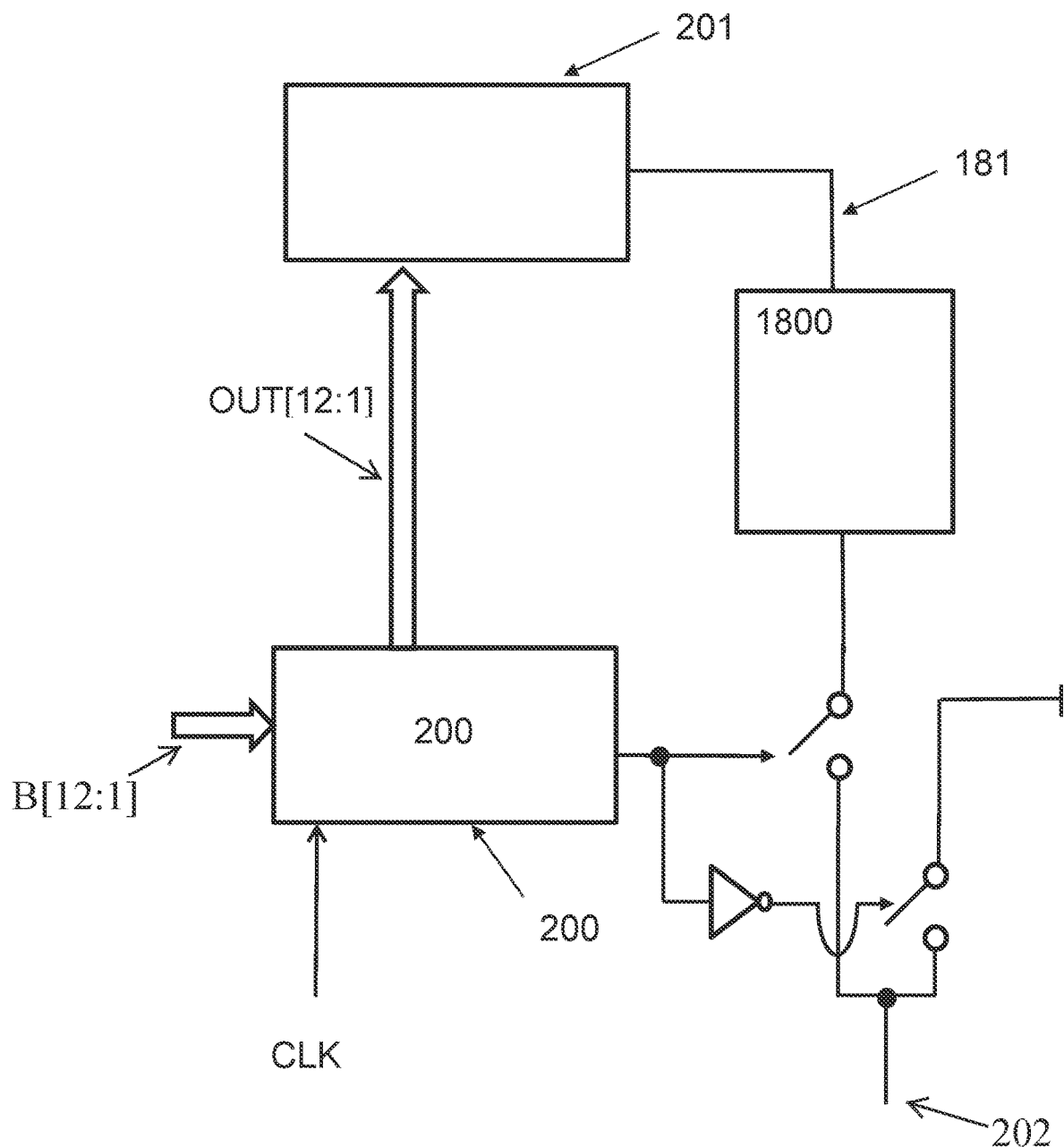
FIG. 20 shows a circuit that enables a less abrupt transition from a low current mode to a high current mode according to embodiments of the present invention.

Another example of a circuit that enables a less abrupt transition from a low current mode to a high current mode is given on FIG. 20. A (binary) down counter 200 is pre-loaded with e.g. a 12 bit code encoding a duty cycle. This 12 bit code (B[12:1]) can include an indicator bit. At the start of a PWM period, the counter is decremented at each clock cycle. As long as the counter is not zero, the output signal is e.g. ON or High. The output signal is OUT[12:1]. As soon as the counter reaches zero, the output is OFF or Low and remains so until the end of the PWM period. The output signal activates a switch connecting the output of a current source like e.g. 1800 to a LED or OLED.

At the same time, a comparator 201 compares the output of the down counter 200 (OUT[12:1]) with a predetermined binary value and changes the state of the select bit $b_S$ of the current source 1800.

Figure 21:
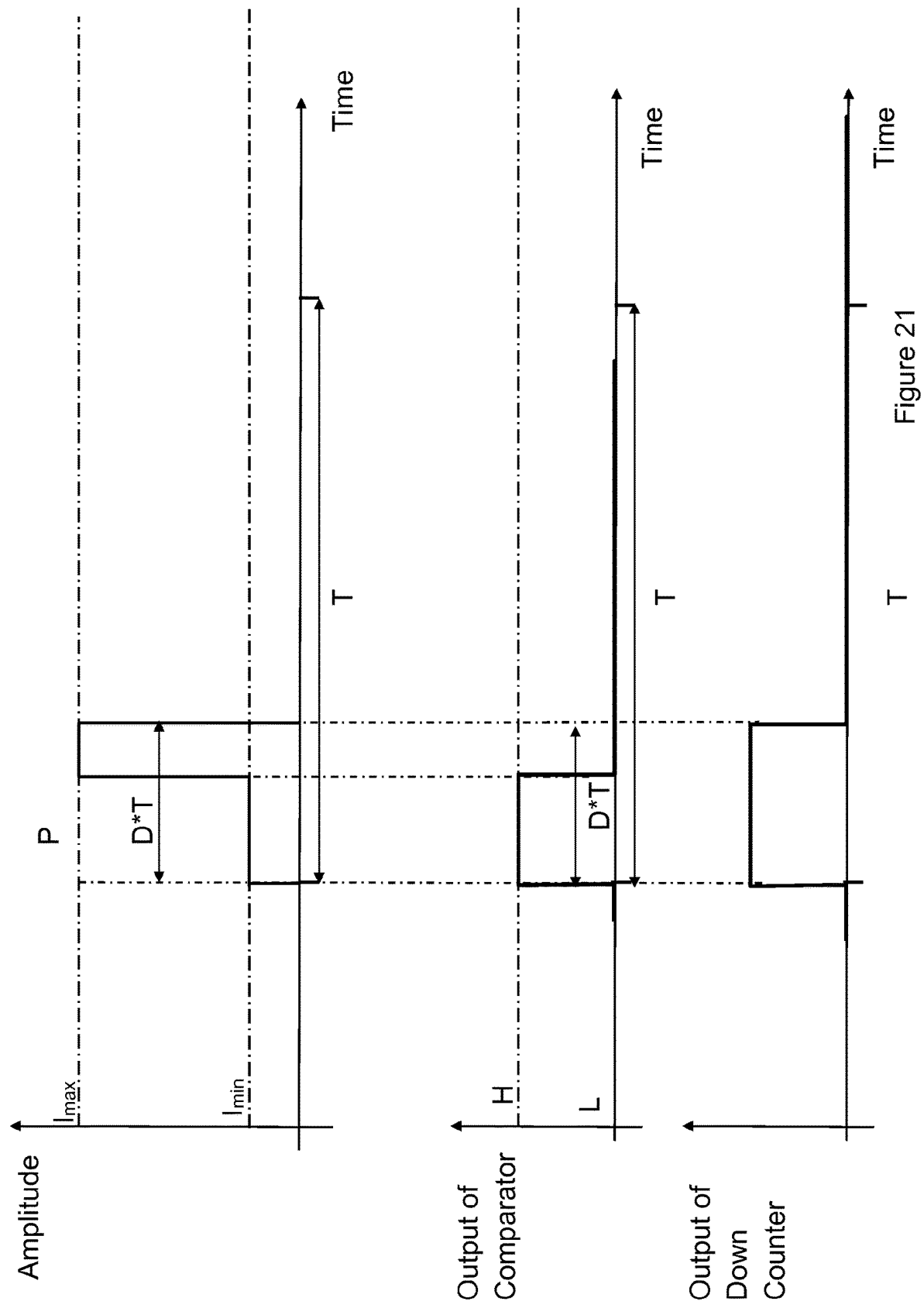
FIG. 21 shows a PWM signal for which the amplitude of the current pulses has a first value during part of the duty cycle and a second value during another part of the duty cycle, according to embodiments of the present invention.

It is therefore possible to generate a PWM signal for which the amplitude of the current pulses will have a first value during part of the duty cycle and a second value during another part of the duty cycle. Such a signal is illustrated on FIG. 21.

Figure 22:
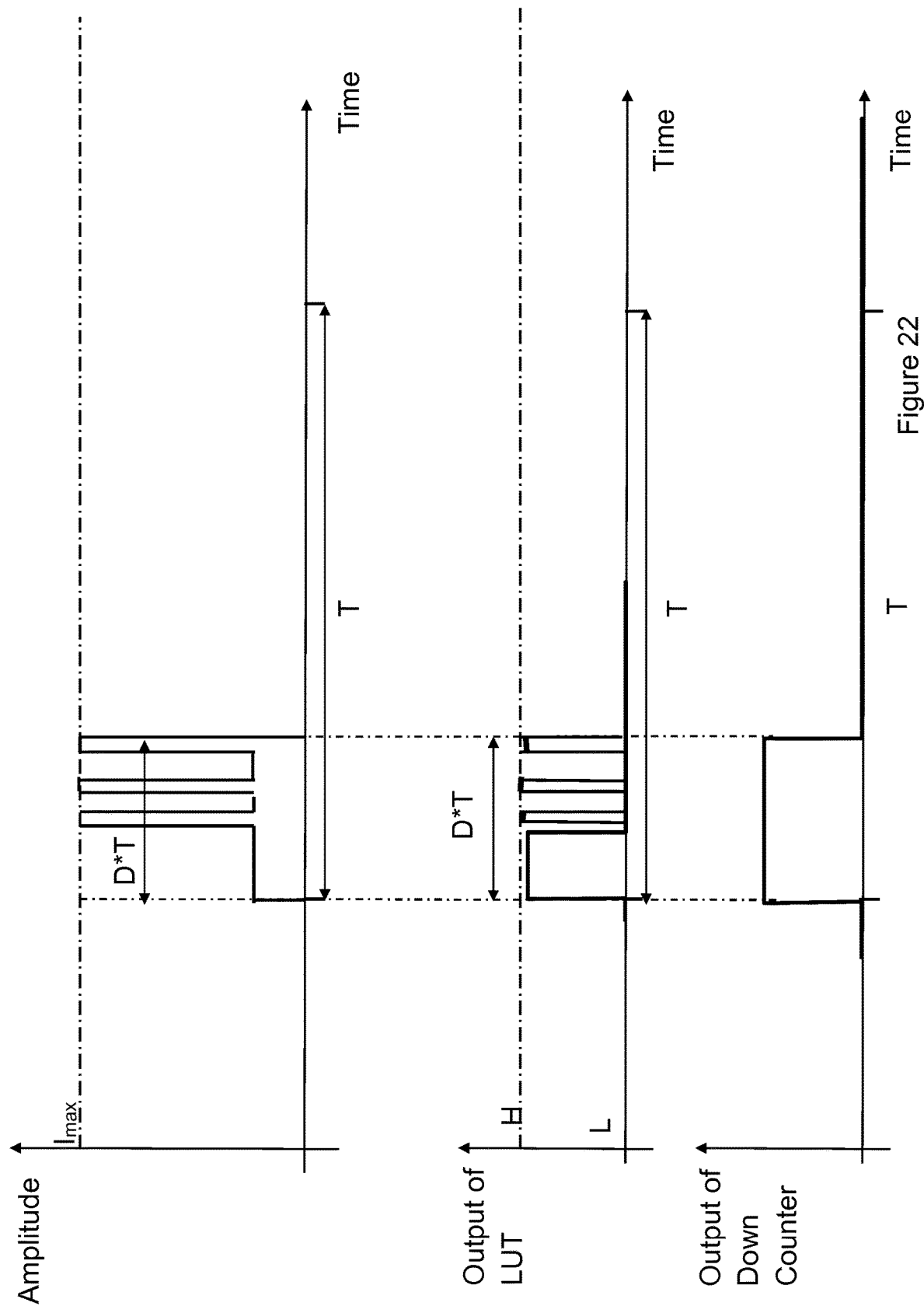
FIG. 22 shows a PWM signal having different pulse durations and different amplitudes, according to embodiments of the present invention.

Instead of a comparator 201, the output of the down counter 200 can be fed to a logic look-up table. This generalization allows synthesizing PWM signals like the one on FIG. 22.

Any of the embodiments of the present invention can be used for OLED displays or LED displays. In any of the embodiments of the present invention a low pass filter can be used. However bearing in mind that brightness is the same as luminance but perceived by the human eye, the human eye acts as a low pass filter that averages the sequence of light pulses. So for the PWM driving pulses the brightness or the average luminance during one PWM period, can be filtered by the eye LPF (Low Pass Filter).

While the invention has been described hereinabove with reference to specific embodiments, this was done to clarify Tables 2 and 3

TABLE 2

| Table 2 Bit Code (b0b1b2 ... b11) | Duty Cycle | Forward Current I | L | ΔL |
|---|---|---|---|---|
| 100000000000 | $1/(2^{12} - 1)$ | $I_{Max}/(2^{12} - 1)$ | $L_1$ | |
| 010000000000 | $2/(2^{12} - 1)$ | $2 * I_{Max}/(2^{12} - 1)$ | $L_2$ | $L_2 - L_1$ |
| ... | ... | ... | ... | ... |
| 011111111111 | ... | ... | $L_{4094}$ | $L_{4094} - L_{4093}$ |
| 111111111111 | 1 | $I_{Max}$ | $L_{Max}$ | $L_{Max} - L_{4094}$ |

TABLE 3

| Table 3 Bit Code (b0b1b2 ... b11) | Duty Cycle | Forward Current 1 | L | ΔL |
|---|---|---|---|---|
| 100000000000 | $1/(2^{12} - 1)$ | $I_{Tr}/(2^{12} - 1)$ | $L'_1$ | |
| 010000000000 | $2/(2^{12} - 1)$ | $2 * I_{Tr}/(2^{12} - 1)$ | $L'_2$ | $L'_2 - L'_1$ |
| ... | ... | ... | ... | ... |
| 011111111111 | ... | ... | $L'_{4094}$ | $L'_{4094} - L'_{4093}$ |
| 111111111111 | 1 | $I_{Tr}$ | $L_{Tr}$ | $L_{Tr} - L'_{4094}$ |

The invention claimed is:

1. A method of using image data, representing images to be displayed in successive frames, to drive an active matrix display having pixels that include a drive transistor and a light emitting device, said method comprising:
converting each frame represented by an n-bit digital image to an (m+1)-bit digital image, wherein m<n, by truncating, for each pixel, the (n−m) least significant bits or most significant bits of the n-bit digital image, and encoding in the (m+1) bit an indication,
supplying each pixel of the (m+1)-bit digital image with a first drive current if the (n−m) least significant bits are truncated, and each pixel of the (m+1)-bit digital image with a second drive current if the (n−m) most significant bits are truncated,
wherein the ratio of the first drive current to the second drive current is such that it results in a brightness ratio of 2^(n−m), and wherein the indication provides information on the drive current to be used,
wherein first drive currents for the bits remaining when the n−m least significant bits have been truncated overlap with second drive currents for bits remaining when (n−m) most significant bits have been truncated.

2. The method according to claim 1, wherein the first and second drive currents which produce the brightness ratio of 2^(n−m) are determined by optical measurements of outputs of the active matrix display.

3. The method according to claim 2, wherein the optical measurements are of a set of pixels used to display a test pattern.

4. The method according to claim 1, wherein a relationship between brightness and drive current is at least in part non-linear.

5. The method according to claim 3, wherein the optical measurements are made using a set of pixels of the active matrix display to display a test pattern according to a Barten Model.

6. The method according to claim 1, wherein the conversion is performed with an electro optical transfer function such as a gamma curve or a PQ curve, or a lookup table derived from an electro optical transfer function.

7. The method according to claim 1, wherein the transition from the first current to the second current is performed such that it results in a luminance increase which is below a minimum detectable contrast evaluated according to a model of the human visual system.

8. The method according to claim 7, wherein the model of the human visual system is based on at least one of just noticeable difference, on the Barten model, on Weber's law, on De Vries-Rose square-root law, on a PQ curve.

9. The method according to claim 1, wherein the pixels of the active matrix display are LED or OLED pixels.

10. The method according to claim 1, wherein each frame can be divided into sub-frames.

11. The method according to claim 10, wherein a sub-frame of a frame is driven with the first drive current and another sub-frame of the frame is driven with the second drive current.

12. A digital driving circuit for driving an active matrix display having pixels that include a drive transistor, a light emitting device, and a digital to analog converter, the digital driving circuit further comprising:
means to convert successive frames represented by an n-bit digital image to a (m+1)-bit digital image, wherein m<n, by truncating, for each pixel, the (n−m) least significant bits or most significant bits of the n-bit digital image, and means to encode in the (m+1) bit an indication,
wherein the digital to analog converter is configured to supply each pixel of the (m+1)-bit digital image with a first drive current if the (n−m) least significant bits are truncated, and each pixel of the (m+1)-bit digital image with a second drive current if the (n−m) most significant bits are truncated, wherein the ratio of the first drive current to the second drive current is such that it results in a brightness ratio of 2^(n−m), and wherein the indication provides information on the drive current to be used,
wherein first drive currents for the bits remaining when the n−m least significant bits have been truncated overlap with second drive currents for bits remaining when (n−m) most significant bits have been truncated.

13. The digital driving circuit according to claim 12, wherein the means to convert comprise an electro optical transfer function such as a gamma curve or a PQ curve, or a lookup table derived from an electro optical transfer function.

14. The digital driving circuit according to claim 12, wherein the transition from the first current to the second current is performed such that it results in a luminance increase which is below a minimum detectable contrast evaluated according to a model of the human visual system.

15. The digital driving circuit according to claim 14, wherein the model of the human visual system is based on at least one of just noticeable difference, on the Barten model, on Weber's law, on De Vries-Rose square-root law, on a PQ curve.

16. The digital driving circuit according to claim 12, wherein the pixels of the active matrix display are LED or OLED pixels.

17. The digital driving circuit according to claim 12, wherein each frame can be divided into sub-frames.

18. The digital driving circuit according to claim 17, wherein a sub-frame of a frame is driven with the first drive current and another sub-frame of the frame is driven with the second drive current.

19. A LED or OLED display comprising the digital driving circuit of claim 12.

20. The LED or OLED display according to claim 19, wherein the LED or OLED display is selected from:
being adapted to generate outputs of the active matrix display for optical measurements to determine the first and second drive currents which produce a brightness ratio of $2^{\wedge}(n-m)$,
being adapted to provide drive currents to a set of pixels to display a test pattern, and
being adapted to drive a set of pixels of the display to display a test pattern according to a Barten Model.

21. The LED or OLED display according to claim 20, wherein the set of pixels is a tile of a tiled display or the tiled display.

* * * * *